United States Patent [19]
Look et al.

[11] Patent Number: 5,670,005
[45] Date of Patent: Sep. 23, 1997

[54] METHOD FOR MANUFACTURING IMPROVED DATA DISPLAY RETROREFLECTIVE SHEETING

[75] Inventors: Thomas F. Look, Ham Lake; Robert V. O'Keefe, New Brighton; Craig A. Schmidt, Wyoming; Bruce D. Orensteen, St. Paul; Joseph M. McGrath, Lake Elmo; Steven E. Poss, Shoreview; Thomas I. Bradshaw, Afton, all of Minn.; Franklin C. Bradshaw, Scottsdale, Ariz.

[73] Assignee: Minnesota Mining and Manufacturing Company, St. Paul, Minn.

[21] Appl. No.: 632,694

[22] Filed: Apr. 16, 1996

Related U.S. Application Data

[63] Continuation of Ser. No. 186,752, Feb. 2, 1994, abandoned, which is a continuation-in-part of Ser. No. 33,625, Mar. 16, 1993, abandoned, which is a continuation-in-part of Ser. No. 17,573, Feb. 16, 1993, abandoned.

[51] Int. Cl.$^6$ .................... B44C 1/165; B32B 31/00; C09J 5/00
[52] U.S. Cl. .................... 156/230; 156/250; 156/277; 156/324
[58] Field of Search .................... 156/277, 230, 156/240, 324, 250

[56] References Cited

U.S. PATENT DOCUMENTS

| | | | |
|---|---|---|---|
| 3,765,994 | 10/1973 | Quaintance et al. | 161/6 |
| 4,082,873 | 4/1978 | Williams | 428/40 |
| 4,204,865 | 5/1980 | Kuehnle et al. | 430/30 |
| 4,214,028 | 7/1980 | Shortway et al. | 428/159 |
| 4,404,249 | 9/1983 | Margerum et al. | 428/216 |

(List continued on next page.)

FOREIGN PATENT DOCUMENTS

| | | |
|---|---|---|
| 905 186 | 11/1986 | Belgium . |
| 0 195 949 | 10/1986 | European Pat. Off. . |
| 0 268 402 | 5/1988 | European Pat. Off. . |
| 0 283 861 A1 | 9/1988 | European Pat. Off. . |
| 0 359 532 A2 | 3/1990 | European Pat. Off. . |

(List continued on next page.)

OTHER PUBLICATIONS

Grant & Hachk's Chemical Dictionary 5th Edn. 1987 pp. 628–629.

3M product literature for 3M's Retro–Reflective Label Stock.

"Printer ribbon re-inker handles all shapes and sizes," Design Engineering, vol. 232, Sep. 1991, London, GB, p. 18, XP238119.

Niche Markets for Non–Impact Printing Technologies by Arthur Diamond, IS&T's Tenth International Congress on Advances in Non–Impact Printing Technologies (1994) pp. 14–18.

Dry Toner Fundamentals by Dr. Trevor I. Martin, Seventh Annual Toner & Developer Industry Conference Imaging Materials Seminar Series, dated Sep. 15, 1990.

Markem Corporation product literature for LP8400 thermal transfer apparatus (May 1992).

"Observations Under Article 115 on Behalf of the British Numberplate Manufacturers' Association," Nov. 27, 1996, with attachments.

Primary Examiner—David A. Simmons
Assistant Examiner—J. A. Lorengo
Attorney, Agent, or Firm—Gary L. Griswold; Walter N. Kirn; Robert H. Jordan

[57] ABSTRACT

A portable system and method for printing variable information indicia on a reflective sign comprises providing a first polymeric sign component having a surface suitable for receiving a printed image. A definition of an image to be printed on the first sign component is provided to a portable computer. Indicia in the form of images is then rapidly transferred to the surface of the first sign component.

52 Claims, 16 Drawing Sheets

U.S. PATENT DOCUMENTS

| | | | |
|---|---|---|---|
| 4,440,590 | 4/1984 | Collins et al. | 156/234 |
| 4,511,602 | 4/1985 | Margerum et al. | 427/148 |
| 4,544,590 | 10/1985 | Egan | 428/40 |
| 4,562,773 | 1/1986 | Diggle | 101/27 |
| 4,581,278 | 4/1986 | Margerum et al. | 428/200 |
| 4,619,876 | 10/1986 | Woodward | 430/11 |
| 4,637,974 | 1/1987 | Kubit | 430/126 |
| 4,650,350 | 3/1987 | Dorner | 400/120 |
| 4,686,549 | 8/1987 | Williams et al. | 503/227 |
| 4,686,898 | 8/1987 | LaManna et al. | 101/18 |
| 4,717,270 | 1/1988 | Tsutsumi | 400/120.04 |
| 4,772,911 | 9/1988 | Sasaki et al. | 347/15 |
| 4,783,837 | 11/1988 | Kawamura et al. | 382/270 |
| 4,844,770 | 7/1989 | Shiraishi et al. | 156/387 |
| 4,847,237 | 7/1989 | Vanderzanden | 503/227 |
| 4,869,941 | 9/1989 | Ohkl | 428/40 |
| 4,870,432 | 9/1989 | Maeda et al. | 347/66 |
| 4,968,063 | 11/1990 | McConville et al. | 283/72 |
| 4,970,655 | 11/1990 | Winn et al. | 364/479 |
| 5,000,812 | 3/1991 | Murphy | 156/268 |
| 5,015,318 | 5/1991 | Smits et al. | 156/233 |
| 5,017,416 | 5/1991 | Imperial et al. | 428/195 |
| 5,028,290 | 7/1991 | Curiel | 156/232 |
| 5,085,918 | 2/1992 | Rajan et al. | 428/195 |
| 5,118,930 | 6/1992 | Takada | 235/462 |
| 5,149,386 | 9/1992 | Smits et al. | 156/150 |
| 5,149,571 | 9/1992 | Croell | 428/40 |
| 5,209,959 | 5/1993 | McNaul et al. | 428/40 |
| 5,262,800 | 11/1993 | Smith et al. | 347/262 |
| 5,310,436 | 5/1994 | Pricone et al. | 156/209 |
| 5,349,534 | 9/1994 | Rousseff et al. | 364/479 |

FOREIGN PATENT DOCUMENTS

| | | | |
|---|---|---|---|
| 0 404 539 A3 | 12/1990 | European Pat. Off. | |
| 0 411 152 A1 | 2/1991 | European Pat. Off. | |
| 0 459 720 A1 | 12/1991 | European Pat. Off. | |
| 2 632 566 | 12/1989 | France. | |
| 28 30230 A1 | 1/1980 | Germany. | |
| 28 31 587 A1 | 1/1980 | Germany. | |
| 3902729 C1 | 3/1990 | Germany. | |
| H5-14882 | 2/1993 | Japan | G02B 5/128 |
| 6-155938 | 6/1994 | Japan. | |
| 2 126 389 | 3/1984 | United Kingdom. | |
| WO92/18328 | 10/1992 | WIPO. | |
| WO95/05945 | 3/1995 | WIPO. | |
| WO95/23698 | 9/1995 | WIPO. | |

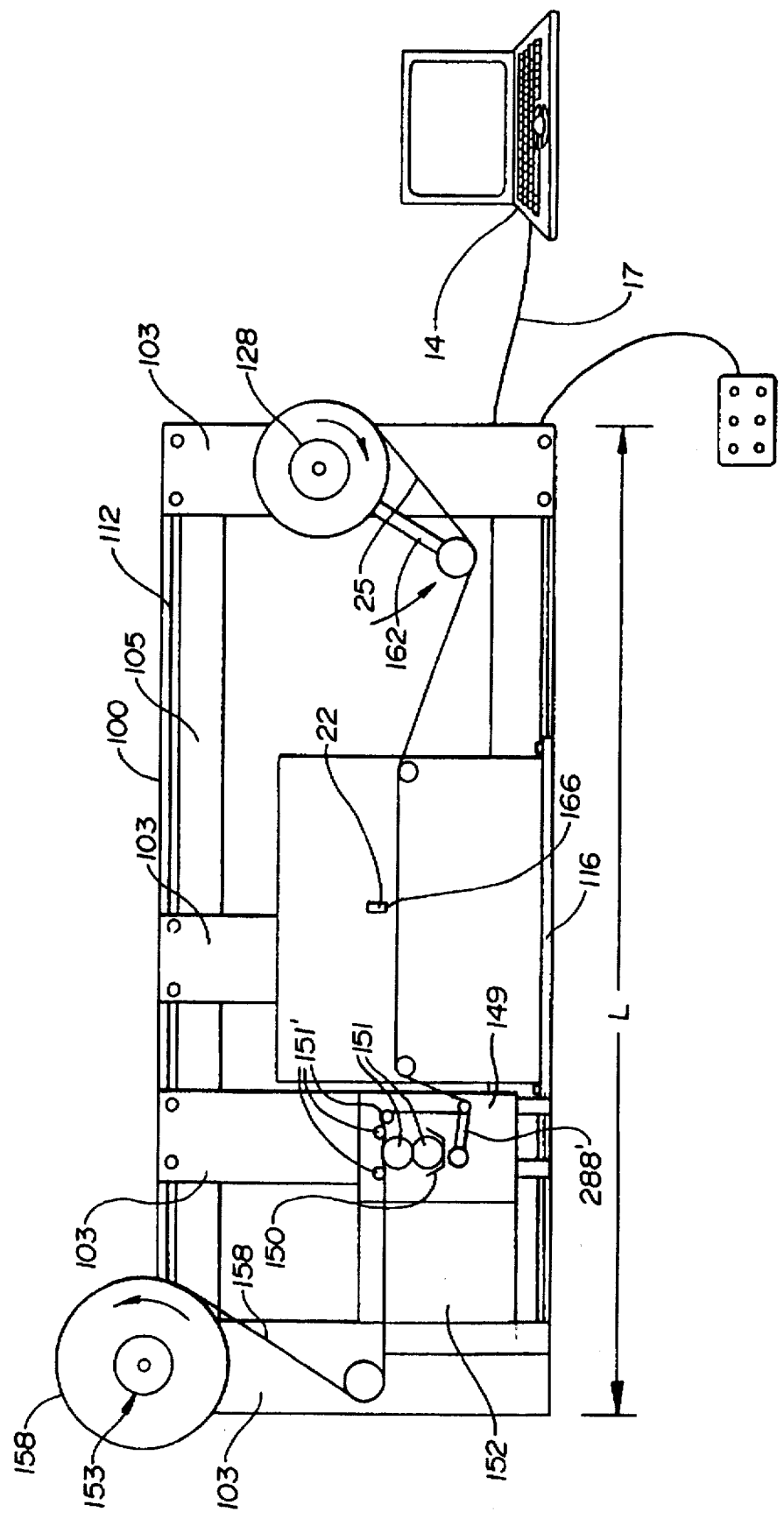

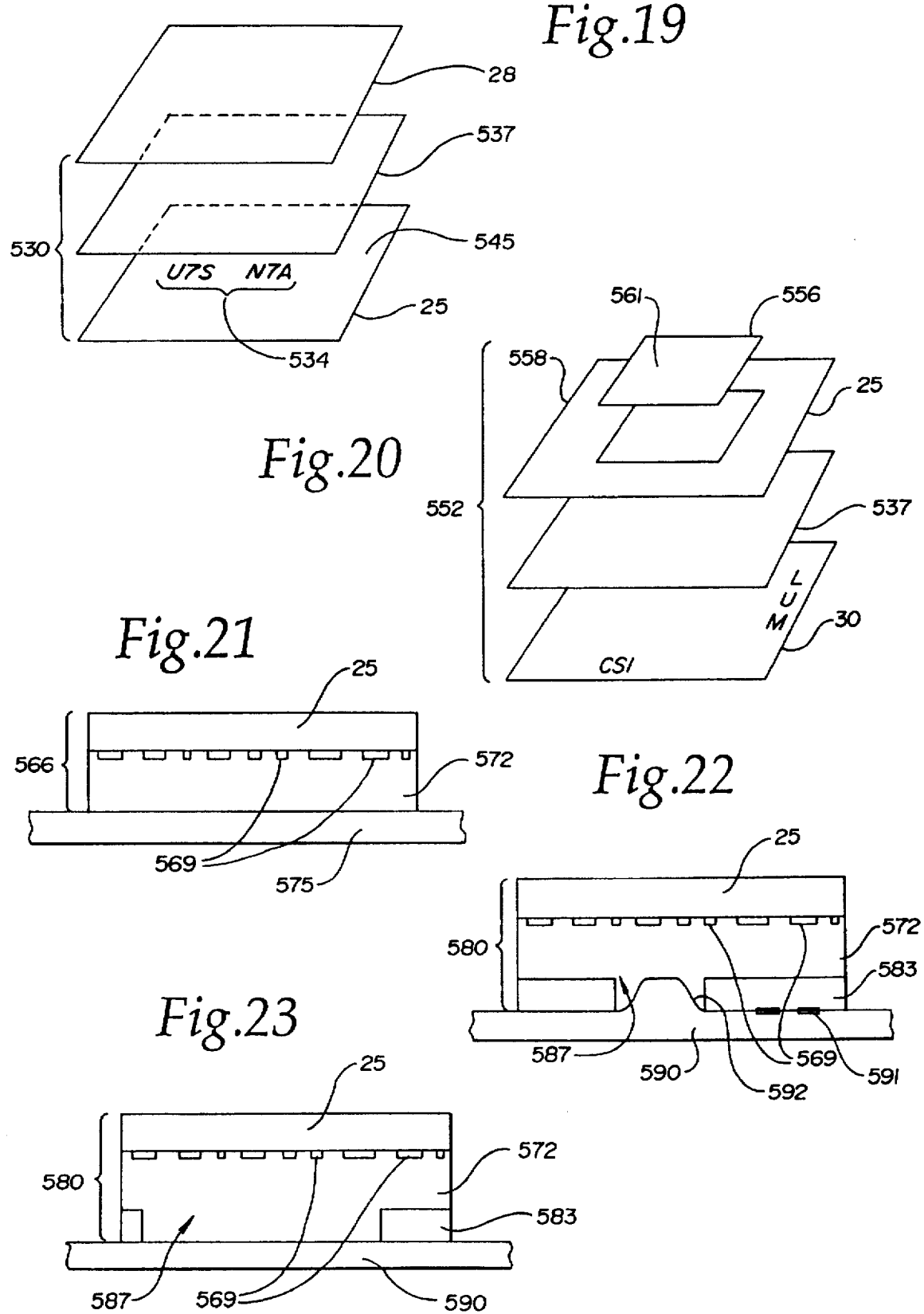

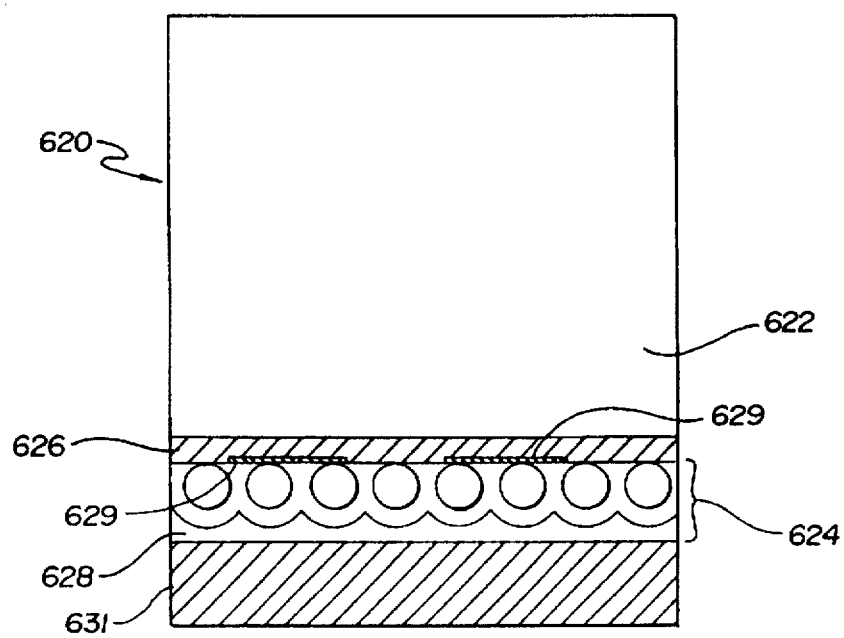
Fig.26
PRIOR ART
Fig.27
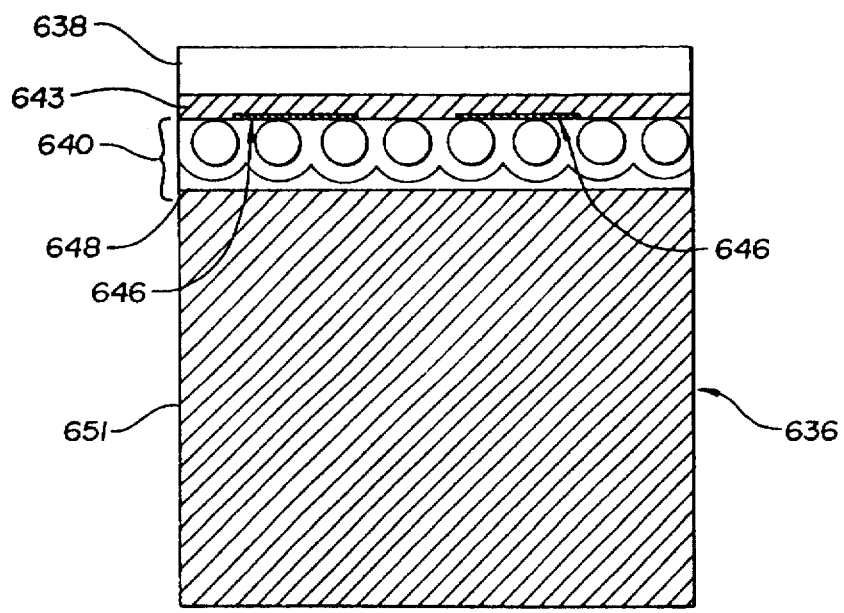

METHOD FOR MANUFACTURING IMPROVED DATA DISPLAY RETROREFLECTIVE SHEETING

This is a continuation of U.S. patent application Ser. No. 08/186,752 filed Feb. 2, 1994 now abandoned which is a continuation-in-part of U.S. patent application Ser. No. 08/033,625, filed Mar. 16, 1993, abandoned, which is a continuation-in-part of U.S. patent application Ser. No. 08/017,573, filed Feb. 16, 1993 abandoned. The disclosure of these applications are incorporated here by reference.

FIELD OF THE INVENTION

This invention relates to improvements in printing data onto retroreflective sheeting and to provide a direct output variable information printing system for use with retroreflective sheeting.

BACKGROUND OF THE INVENTION

Numerous problems exist relating to production and recognition of data and characters used with retroreflective sheeting. In the fields of signage for license plates, road/street markings, and validation sticker manufacture, there is a wide variety of alpha-numeric data printing styles used with retroreflective sheetings which create various levels of recognition by viewers of the sheeting. Typically, manufacturing of license plates and similar products is accomplished by processes which use large and expensive equipment that requires extensive time and training of personnel. Often these processes utilize solvents and generate considerable wasted byproduct if the manufacturing is halted within a process run. Products produced by typical manufacturing processes do not contain substantial variable information, and the equipment is usually only centrally located due to the size and expense of these machines.

Alternate manufacturing processes include silk screening, block printing, pre-cut lay out systems, and hand-cut laying up using various cutting machines to cut outlines of lettering and then pre-masking of the products prior to stripping liner material off of the products. These systems are typically inconsistent in output and are notoriously inefficient. While certain systems, such as that disclosed in U.S. Pat. No. 5,085,918 issued to Rajan et al., disclose means of printing retroreflective sheeting which comprise substantial improvements over other known manufacturing processes, these systems still use relatively expensive large machines which do not meet the needs of a wide variety of users.

SUMMARY OF THE INVENTION

The present invention provides a method of printing an image on a retroreflective polymeric material comprising: a) providing polymeric film and a reel assembly for dispensing the polymeric film, the film having a first surface suitable for receiving print indicia from a printer and a second surface suitable for attachment to a retroreflective sheeting; b) providing a definition of an image to be printed as indicia on said polymeric film first surface to a computer; and c) employing the computer to transfer the indicia in the form of the image to the film first surface using a computer controlled printer arranged for receipt of the polymeric film through use of a modular and portable frame assembly upon which the printer and the assembly for dispensing the film to the printer are both mounted.

The invention also includes a modular and transportable printing system for printing indicia on polymeric sheetings. The system comprises a frame assembly portion comprising at least one horizontal rail member and at least one vertical rail member assembled as an open frame structure, the rail members having walls defining apertures suitable for receiving, in modular fashion, system components as needed for different printing and manufacturing tasks; interchangeable reel assemblies for holding, dispensing, and rewinding sheeting material used with the printing system; and a printer mechanism comprising a printer suitable for printing variable indicia received from a computer onto a surface of a first sheeting material.

The invention also includes manufacture of a license plate comprising a thin polymethyl methacrylate film face layer having a thickness of less than about 1 millimeter; an adhesive layer; thermally printed indicia printed onto a retroreflective sheeting; a retroreflective sheeting; and a durable backing layer connected to the retroreflective sheeting.

The invention also comprises a retroreflective polymeric sheeting with variable printed indicia which provides residual evidence of tampering due to distortion of the indicia when removed from an initial substrate. Retroreflective sheeting used with this invention may be "beaded sheeting" in the form of an encapsulated-lens sheeting (see, for example, U.S. Pat. Nos. 3,190,178; 4,025,159; 4,896,943; 5,064,272; and 5,066,098, the disclosures of which are incorporated here by reference), enclosed-lens sheeting (see, for example, U.S. Pat. No. 2,407,680, the disclosure of which is incorporated here by reference), or may comprise retroreflective cube corner elements (see, for example, U.S. Pat. Nos. 3,684,348; 4,801,193; 4,895,428; 4,938,563, the disclosures of which are incorporated here by reference).

BRIEF DESCRIPTION OF THE DRAWINGS

FIG. 3c is a side elevation schematic view of a printing system for manufacturing improved data display retroreflective sheeting in accordance with the present invention.

FIG. 9 is a side section view of a laminator assembly taken along line 9—9 of FIG. 3a.

FIG. 10 is a side elevation and partial section view of a sheeter assembly taken along lines 10—10 of FIG. 3a.

FIG. 19 is an exploded schematic view of an embodiment of the sheeting product shown in FIG. 16.

FIG. 20 is an exploded schematic view of an embodiment of a sheeting product.

FIG. 21 is a side section schematic view of an embodiment of a sheeting product in accordance with the present invention.

FIG. 22 is a side section schematic view of an embodiment of a sheeting product in accordance with the present invention applied to a non-smooth surface.

FIG. 23 is a side section schematic view of an embodiment of a sheeting product in accordance with the present invention applied to a smooth surface.

FIG. 26 is a side section view of a known license plate construction.

FIG. 27 is a side section view of an improved construction license plate in accordance with the present invention.

DETAILED DESCRIPTION OF PREFERRED EMBODIMENTS OF INVENTION

In describing preferred embodiments of the invention, specific terminology is used for the sake of clarity. The invention, however, is not intended to be limited to the specific terms so selected, and it is to be understood that each term so selected includes all the technical equivalents that operate similarly.

Systems for manufacturing retroreflective sheeting based products used for signage, license plates, and other purposes, comprise numerous inefficiencies and undesired expenses. Often these systems use machines that are quite large and require extensive training of many people, and are cumbersome to operate. While these systems might be relatively efficient at very high volume operations, they are less suited for flexibility and dispersal to locations of production where production volume may be less. While various aspects of current systems may be utilized in combination with features of this invention to produce novel products with great advantage, as claimed below, a preferred new system for manufacturing retroreflective sheeting is schematically disclosed in FIG. 1.

Figure 1:
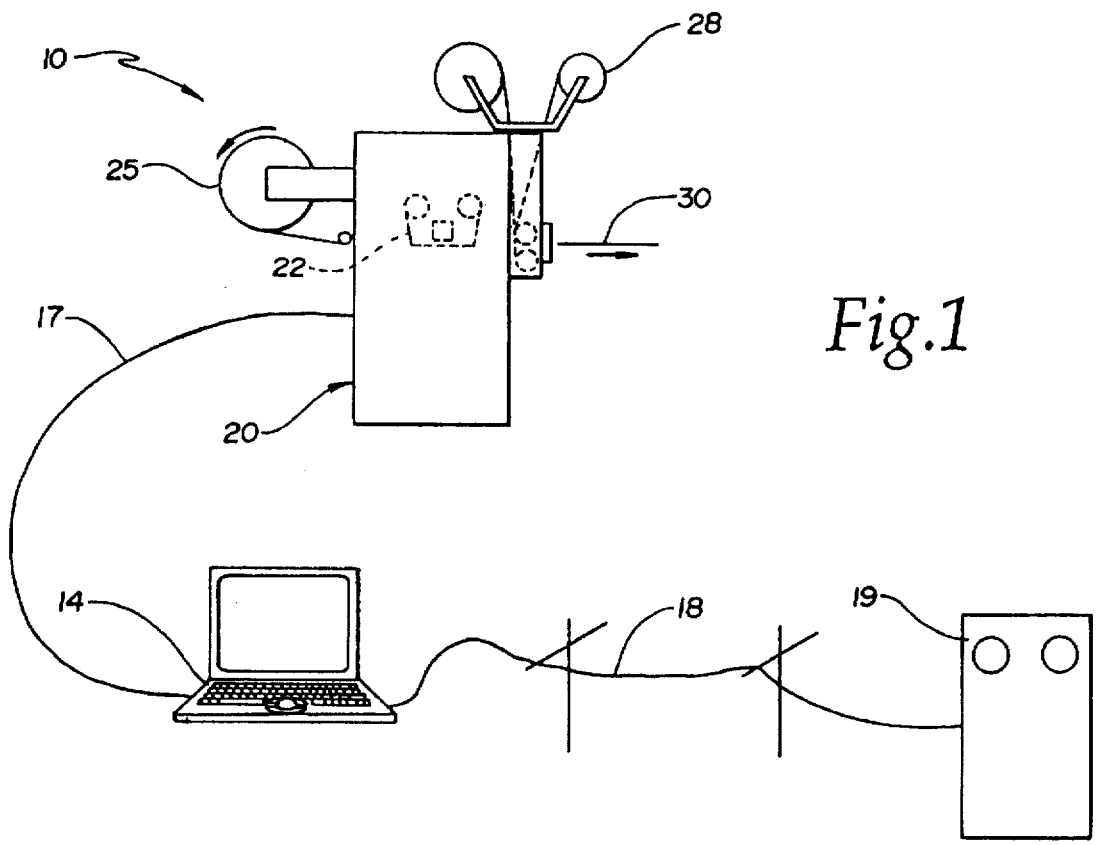
FIG. 1 is a schematic view of a printing system for manufacturing improved data display retroreflective sheeting in accordance with the present invention.

Printing system 10 shown in FIG. 1 comprises data input means, such as personal computer 14, connected by data line means 17 to a printing system such as an inkjet or thermal printer 20. System 10 also may be optionally connected by telephone or other communication means 18 to a central data unit 19 to obtain or verify certain print information. In one embodiment of printing system 10, printer 20 preferably comprises a thermal transfer device such as that sold under the trade name TEK 402-A, or other similar printers manufactured, for example, by Printronix Corporation of Irvine, Calif. Single or multi-color printers may be used.

Preferably, printer 20 comprises means for producing a large smooth font of data and producing that data in a fast print formatting time period. The printer preferably should be capable of re-formatting and printing at least about 35 square inches (90 cm$^2$) to about 50 square inches (127 cm$^2$) of printed product per second. This results in a very high rate of production, essentially without slowing the manufacturing process due to reformatting time between products. For example, vehicular license plate sheetings having a size of about 5 inches×20 inches may be readily manufactured using printing system 10 at about 15 plates per minute. Additional features of printer 20 include ruggedness and durable components capable of producing about 1 million feet or more of printed products per year, at a low equipment cost of less than about U.S. $20,000. Yet another advantage of printing system 10 comprises use of computer 14 to control flow of the print medium (ink, colorant/binder) very precisely, using dwell time and temperature, while coating a thermal print pigment directly onto retroreflective beads/lenses to achieve diurnal color equality or to permit color toning. This is particularly useful, for example, when printing non-black tones for non-essential or more subtle portions of a license plate which identify a car dealer, garage or manufacturer of a license plate rather than the essential plate identifying indicia.

When printer 20 is a thermal printer, it preferably uses a wax or resin based thermal transfer ribbon 22. Although different ribbons may be used in certain embodiments, examples of suitable ribbons include those sold under the trade names Zebra No. 5099 or 5175 (resin) or 5030 (wax) by Zebra Technologies Corporation of Vernon Hills, Ill., or Sony Corporation 4077 (wax), Printronix dense wax 2150 or regular wax 2200, or Azcoat™ black wax AZ 1120-87 manufactured by Process Label Corporation, Minneapolis, Minn. If the binder in a ribbon comprises a significant amount of waxes such as paraffin, microcrystalline wax, beeswax, candelilla, ozocerite, or carbowax, the ribbon is considered a wax-based ribbon. Waxes are low-melting organic mixtures or compounds of high molecular weight, solid at room temperature, and generally similar in composition to fats and oils, except that they contain no glycerides. Waxes are thermoplastic, but since they are not high polymers, they are not considered to be in the family of plastics. The thermoplastic properties of waxes make them excellent candidates for binders in thermal transfer ribbons, because they tend to have sharp melting points, and are low in viscosity in the molten state. This allows colorant/binder to flow readily into paper fibers or onto films. Waxes are useful for ribbons used for thermal printing, but have the drawback that the transferred colorant/binder from wax-based ribbons often easily smears and scratches off of printed articles unless it is sealed in some suitable manner.

Other polymers may be substituted for waxes in ribbons. Ribbons made from such binders generally are called resin-based ribbons. Resin binders in general do not have sharp melting points as waxes do, but they are tougher and do not smear or scratch off like waxes do. Resin-based ribbons may have some proportion of wax binders in order to adjust certain properties of the ribbon, e.g., release properties, flow characteristics, and the like.

A printable film 25 is passed through thermal printer 20 and receives printed indicia that is formed when ink, or pigment/colorant and binder is transferred from thermal transfer ribbon 22. The printable film may then be combined with another substrate, such as sheeting 28. A finished product of sheeting 30, such as that shown and described below in reference to FIG. 2, and which is optionally retroreflective, is produced.

It is recognized that if printable film 25 is not to be covered or treated with another composition or layer, for example, so that the printed indicia is on an outer or topmost surface of the final article, then selection of the printable film depends more substantially on the characteristics of print receptivity, durability, weatherability, and other features. Examples of suitable top printable films for direct thermal printing include films and compositions disclosed in the co-pending, commonly assigned patent application titled "Thermal Print Receptive and Frangible Retroreflective Polymeric Sheetings" (Attorney Docket No. 48442USA6D) which has been filed concurrent herewith by Bruce D. Orensteen et al., and is incorporated here by reference. Examples of such sheeting films include various durable polymeric sheeting materials of greater than about 6 microns in thickness and preferably formed from a composition comprising a polyurethane. The present invention, however, is not limited to the above referenced materials.

The polymeric sheeting film may be formed from a composition comprising an aqueous aliphatic polyurethane dispersion as disclosed in the above incorporated reference. Generally, such a film may be formed from a composition comprising between about 70 and about 100 parts by weight aqueous dispersion of polyurethane, the dispersion comprising between about 45 and 55 parts of water, between about 30 and about 40 parts of aliphatic polyurethane, between about 8 and 20 parts of N-methylpyrrolidone and between about 1.0 and 2.0 parts of triethylamine. The composition may further comprise up to about 5 parts by weight aziridine crosslinker, or up to about 4 parts by weight melamine crosslinker. The composition could also be comprised of an aqueous aliphatic polyurethane dispersion formed from a composition comprising from about 0 to about 60 parts by weight acrylic emulsion and about 40 to about 100 parts by weight aqueous dispersion of polyurethane, which aqueous polyurethane dispersion comprises between about 45 and 55 parts of water, between about 30 and about 40 parts of aliphatic polyurethane. The film may also be formed from a composition comprising polyethyleneterepthalate and vinylidine chloride/acrylonitrile copolymer.

Sheeting 28 or printable film 25 may comprise a non pre-coated sheeting, a cube corner element sheeting, or a retroreflective sheeting comprising exposed glass beads, encapsulated lenses, or enclosed lenses. Printable film 25 may comprise a variety of film materials, as disclosed above, although a suitable film comprises a 12 micron to 100 micron thick polymethyl methacrylate (PMMA) material—provided the printable film is not used as a top printable film. In an embodiment such as that disclosed in FIG. 1, retroreflective sheeting material 28 and printable film 25 are preferably laminated together using an adhesive. Alternately, if the lamination is not required then retroreflective sheeting 30 may be produced with use of a retroreflective top printable film 25.

Printing system 10 provides a low cost, modular, readily transportable system for printing indicia on polymeric sheeting materials. Although other systems are known for placing indicia on sheeting materials, such systems are large and require sizable volumes of articles to be produced in order to be profitable. System 10, in contrast, is suitable for very small volume production as well as large volume tasks. The small size of system 10 reduces on-line material waste, requires less power, and is operable with less people than known printing systems for use with such media. Indeed, system 10 may even be operated with common household power supplies, as discussed further below.

System 10 allows automation with computer 14, such as a portable desktop or laptop computer, to sort, verify, report, and utilize various data. This promotes dispersal of system 10 to remote sites and relieves central repositories of data from unnecessary processing slowdowns. These automation features further enable improved direct marketing, distribution, and on-line auditing of the production of system 10. This is a particularly advantageous combination of features when the articles produced include variable information indicia. For example, this invention facilitates printing, issuance, and verification of articles having item-specific indicia at dispersal facilities. Variable information for this kind need not be varied at a regular increment, such as in an alphanumeric sequence. Instead, indicia may be varied in an item specific manner, for example, by selecting article-specific indicia immediately prior to printing such indicia upon an article. Article-specific indicia may be generated based upon desired input criteria, such as registration status, name of individual requesting a printed article, printing date, expiration date, product number, warehouse location and the like. Combinations of criteria also may be used, and/or separate criteria may be used to form sub-elements of the formed indicia.

Bar-coded labels or stickers are often used to identify and maintain appropriate levels of inventory, for example, in a warehouse or distribution center. In addition to the use of labels for inventory control, durable and/or weatherable articles constructed from polymeric sheetings of the invention also may be tamper evident or frangible, in order to inhibit theft and/or transfer of labels from one item or package to another item or package. Security also may be enhanced by forming some potions of the variable information indicia in a random or otherwise unpredictable manner. Randomized variable information indicia for labeled packages may be maintained in a secure central information storage system to inhibit fraud or theft. The randomized variable indicia adheres to an upper portion of the printable film or sheeting to produce an article. Such articles may or may not be combined with additional components to create signage articles such as traffic control materials, retroreflective and non-retroreflective vehicle markings, retroreflective garments, indoor/outdoor labeling products, frangible security stickers, product authentication sheetings, inventory labeling and control products, identification systems, or license plate sheetings. Articles produced by system 10 may further comprise articles with indicia applied before application of indicia by system 10, such as through use of printable film 25 or sheeting 28 which is pre-printed using other printing means.

Figure 3A:
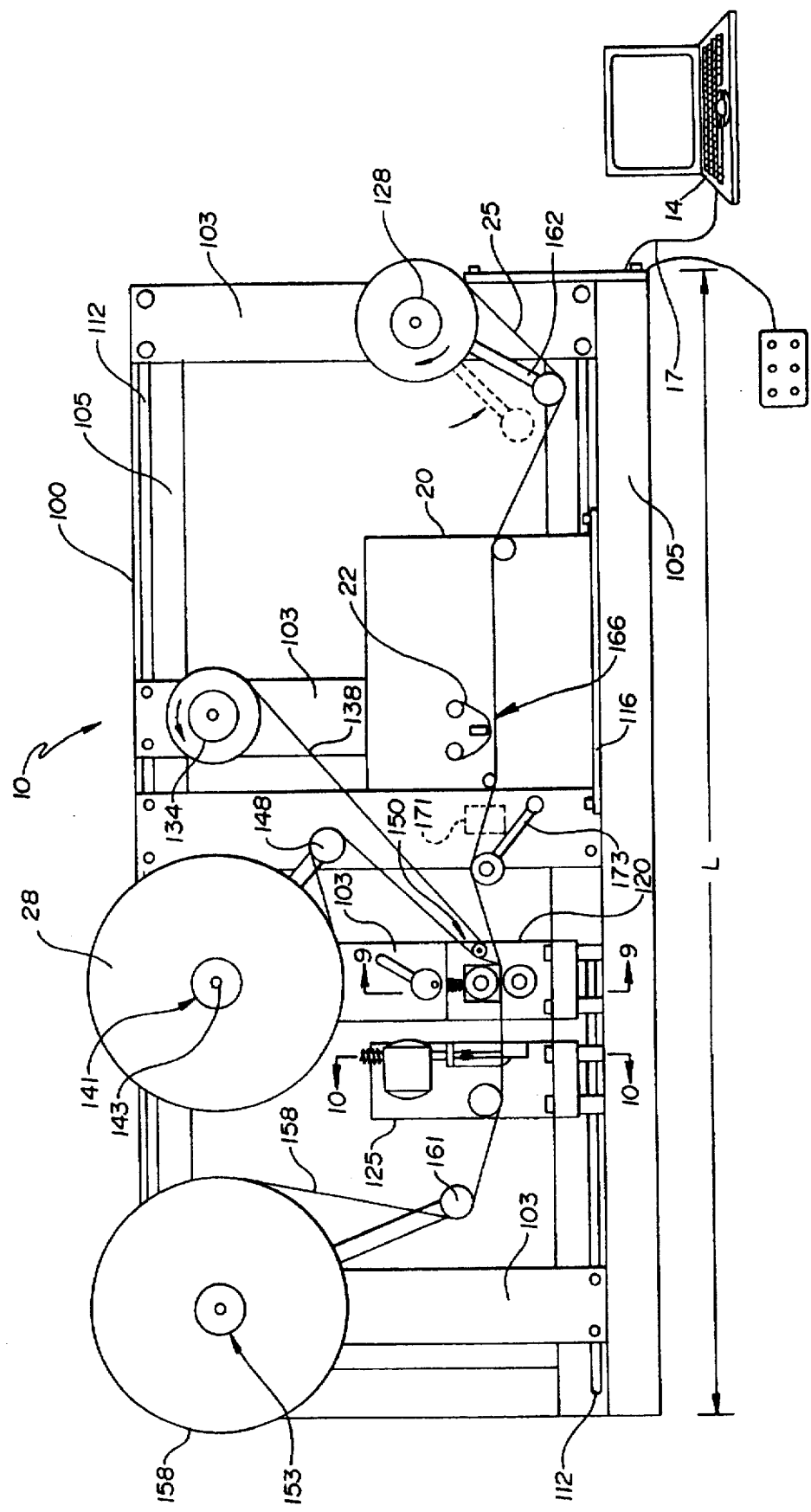
FIG. 3a is a side elevation schematic view of a printing system for manufacturing improved data display retroreflective sheeting in accordance with the present invention.
Figure 3B:
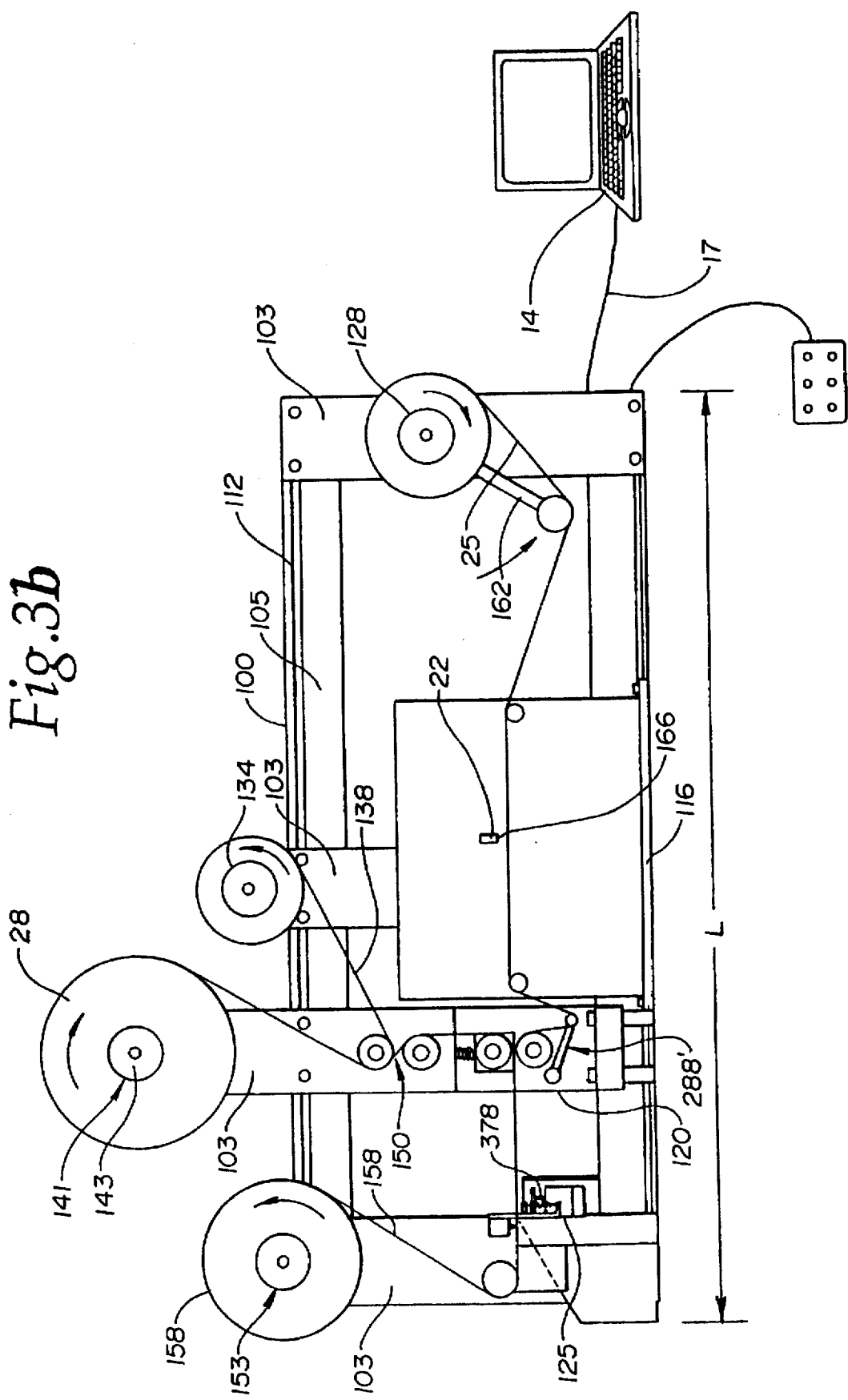
FIG. 3b is a side elevation schematic view of a printing system for manufacturing improved data display retroreflective sheeting in accordance with the present invention.
Figure 5:
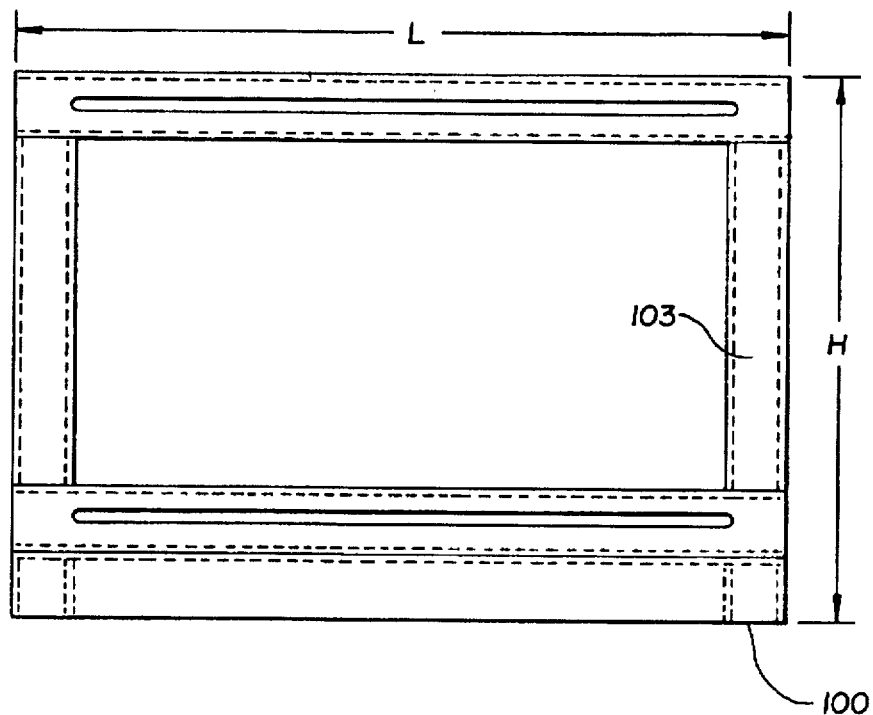
FIG. 5 is a side view of a printing system frame U-channel type rail assembly.
Figure 4:
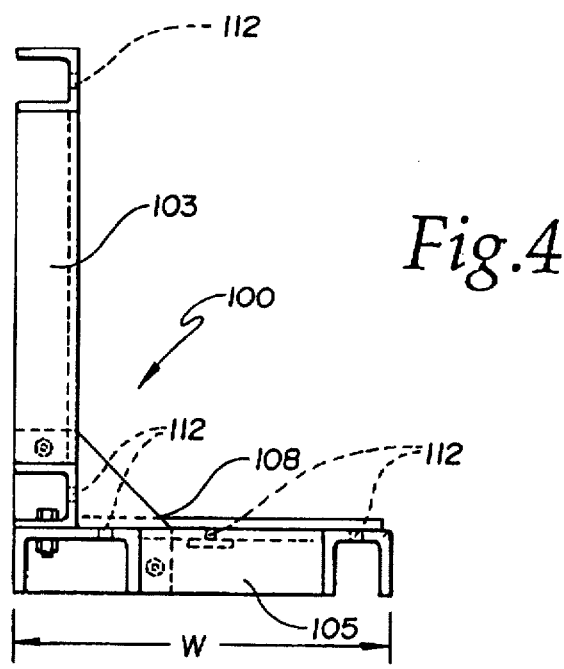
FIG. 4 is a side elevation view of a printing system frame rail assembly.

FIGS. 3a, 3b, and 3c disclose embodiments of printing system 10 designed for optimal portability, interchangeability of components, reversibility of components, and ease of modular expansion for different products. Printing system 10 preferably comprises frame assembly 100 which has a substantially non-enclosed configuration of vertical rail members 103 and horizontal rail members 105. Preferably the rail members each are welded and then bolted together, and may further comprise an end gusset 108, shown best in FIG. 4, for further strength and alignment. A strong material is required for frame assembly 100, such as an iron, steel, or aluminum. A plurality of slots 112 are variously arranged to provide mounting means for receiving and securing other system components to frame assembly 100 in an efficient yet sturdy manner. For example, printer 20 is readily placed on horizontal rail assembly 105 and then accurately positioned and secured at the proper location along length L according to the particular operation required. Although angle iron-type rail assemblies are depicted in FIGS. 3a, 3b, 3c, and 4, and U-channel type assemblies are depicted in FIG. 5, other strong shapes may be acceptable and within the scope of this invention.

The dimensions of frame assembly 100 may vary according to uses required; however, frame assembly 100 preferably is quite compact and lightweight regardless of any reasonable length necessary to accommodate the number of modular components as shown and described below. Printing system 10 preferably has a size and weight that enables it to be transported relatively easily by either one or two persons. For example, in the embodiments shown in FIGS. 3a, 3b, 3c, 4, and 5, frame assembly width W is about 18 inches (46 cm), height H is about 36 inches (91 cm) and length L, which is particularly variable, is about 60 inches (152 cm). In general, the printing systems occupies a volume bounded by those dimensions and has a weight of approximately 190 to 220 pounds (86 to 100 kilograms).

Referring again to FIGS. 3a and 3b, printing system 10 is shown with frame assembly 100 providing support and alignment for a plurality of system components. Printer 20 is shown as a ribbon based printer in FIG. 3a and an inkjet printer in FIG. 3b. Printer 20 may actually comprise a plurality of printers, and is shown positioned on optional mounting plate 116 for ease of movement along the frame assembly. Mounting plate 116 is preferably connected with a bolt mechanism to a printer clamp rail and clamp plate to permit ease of positioning and securing along rail member(s) 105. This feature is also useful with other system components.

FIGS. 3a and 3b disclose additional components such as laminator assembly 120, laminator input dancer assembly 173, sheeter assembly 125, and a plurality of reel assemblies 128. Reel assembly 128 is designed to hold and dispense a printable media suitable for receiving printed indicia which, in the embodiments depicted, comprises printable film 25. A liner re-wind reel 134 provides means for rewinding a liner material 138. Sheeting reel assembly 141 comprises sheeting reel 143 for holding and dispensing sheeting 28. The sheeting reel assembly 141 further comprises optional tensioner and auxiliary unwind mechanism 148 (FIG. 3a) to facilitate proper tension at a location 150 suitable for liner removal. Optional product rewind reel assembly 153 is useful for rewinding printed products such as printed laminated retroreflective sheeting 158 when the product is desired in a roll form. An optional tensioner mechanism 161 (FIG. 3a) also may be provided, which operates similar to mechanism 148. A position adjustment assembly is also provided on each reel assembly to provide axial movement of each mandrel to adjust the tracking of materials on the reel assemblies.

The embodiments of system 10 shown in FIG. 3c is similar to that of FIGS. 3a and 3b. However, the embodiment shown in FIG. 3c includes a roll coater assembly at location 150 rather a liner removal site. Coating rollers 157 transfer adhesive to film 25, with idler and tension rollers 151 maintaining tension in the film during application. Curing ovens 152 permits curing of the adhesive on the film prior to re-wind. In this embodiment, laminator 120 is replaced by the roll coater assembly and the curing oven.

Printing system 10 provides interchangeable reel means for receiving, holding, dispensing, and rewinding various sheetings or sheeting layers. This feature is useful in reducing the inventory of spare parts and maintenance tools required for reliable system performance. The configuration is also of modular design to enable expansion or contraction of the system components with great ease. Various types and numbers of printers may be used with printing system 10, certain non-laminated products may be advantageously processed with this system without any laminator assembly 120 or related equipment, additional laminator assemblies may be added, and sheeter assembly 125, useful for cutting products to a desired length, may be added or removed as necessary.

In operation, readily transportable printing system 10 preferably comprises a thermal printing component which utilizes either the wax or resin based ribbons described above. Printable film 25 is configured on printable film reel assembly 128. Optional tensioner mechanism 162 provides tensioning and overspeed protection so that printable film 25 passes through printer 20 to receive printed indicia at a printing location(s) depicted generally as location 166. The printable film exits the printer component and is either routed to laminator assembly 120 or receives additional printing/indicia prior to further processing. In some embodiments, the printed film may be routed directly to a cutting or rewind station.

Figure 12:
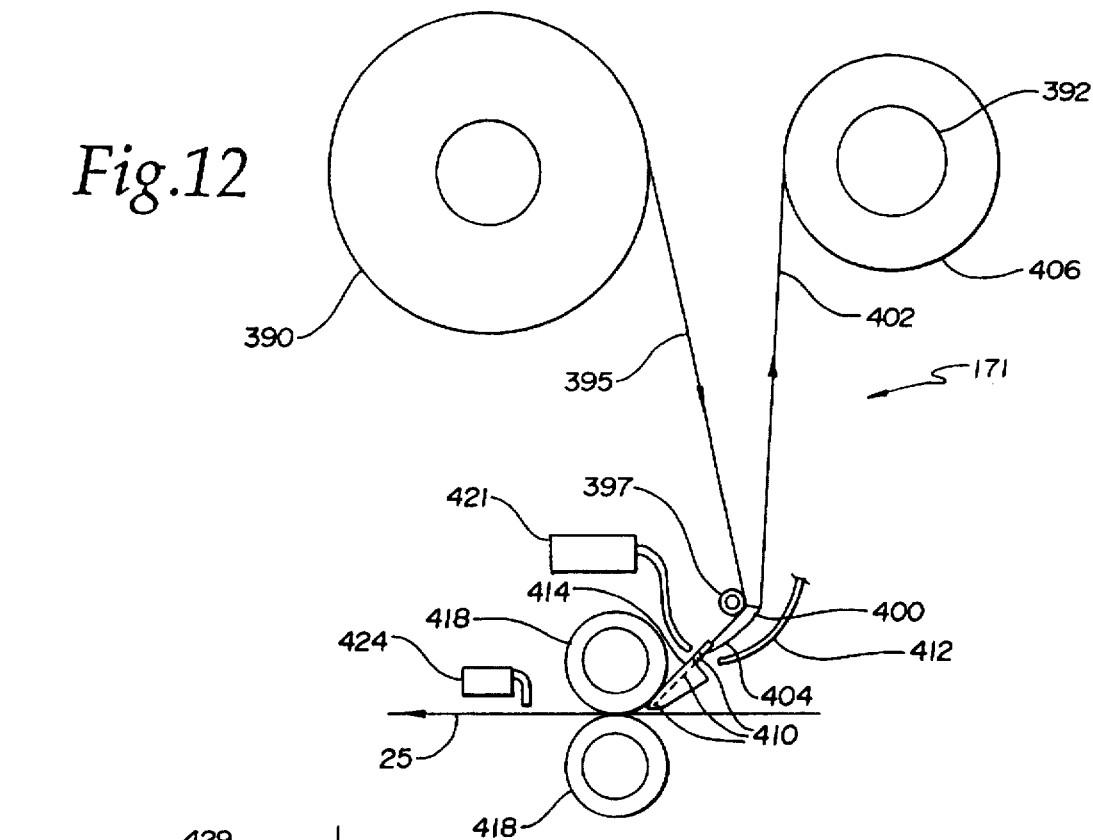
FIG. 12 is a front view of a strip indicia applicator assembly.

FIG. 3a and FIG. 12, described more fully below, discloses one embodiment of an optional strip indicia applicator assembly 171 useful for applying strips or labels of indicia onto the printable media prior to further processing. This is particularly useful for applications where a manufacturer's identity, or other non-variable indicia, is to be placed on a product in combination with variable printed indicia. As noted above, this indicia might also be pre-applied to printable film 25 or sheeting 28 prior to use with system 10. The strip indicia may comprise a holographic label.

Figure 8A:
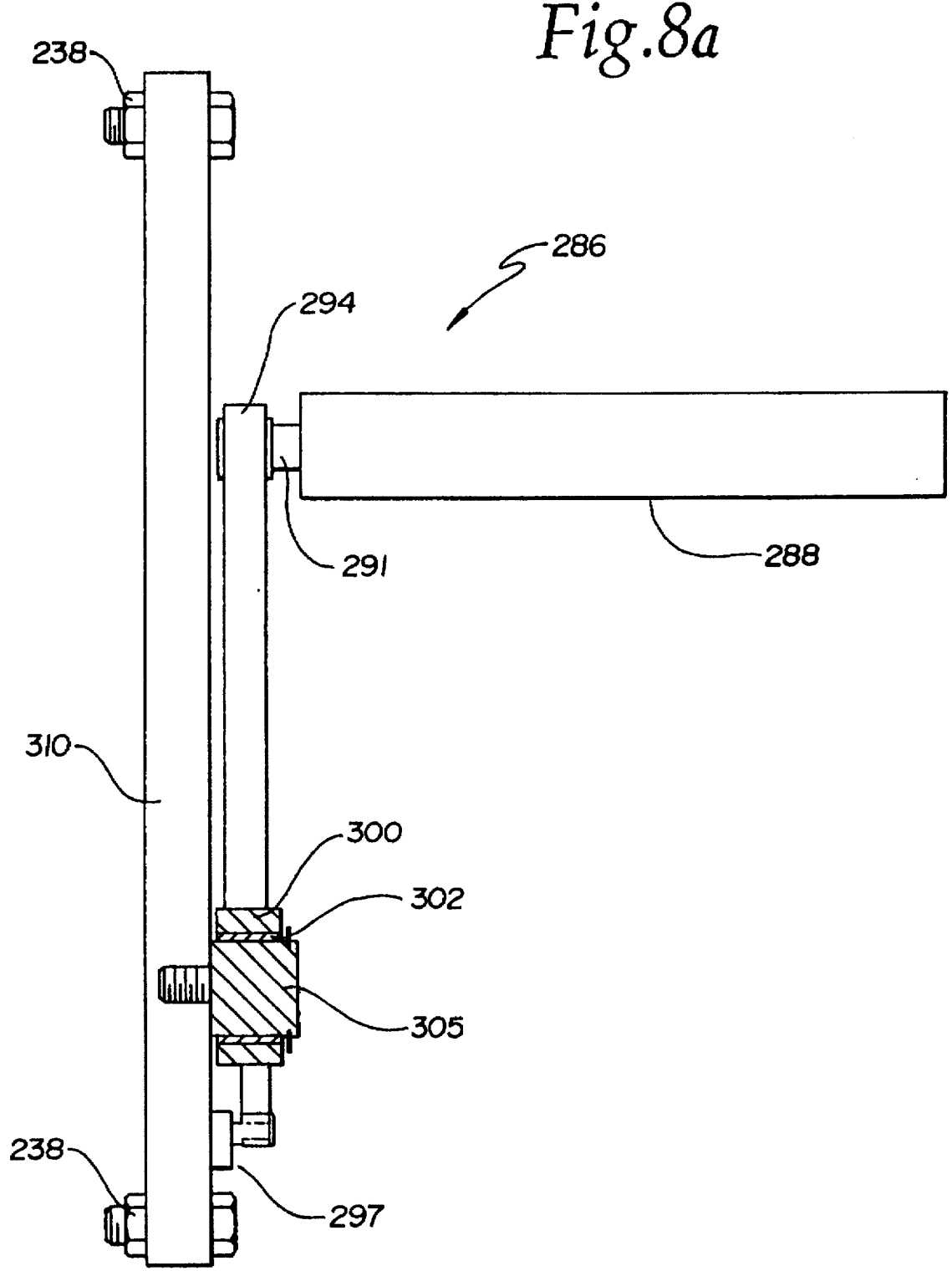
FIG. 8a is a side section view of a laminator input dancer assembly.
Figure 8B:
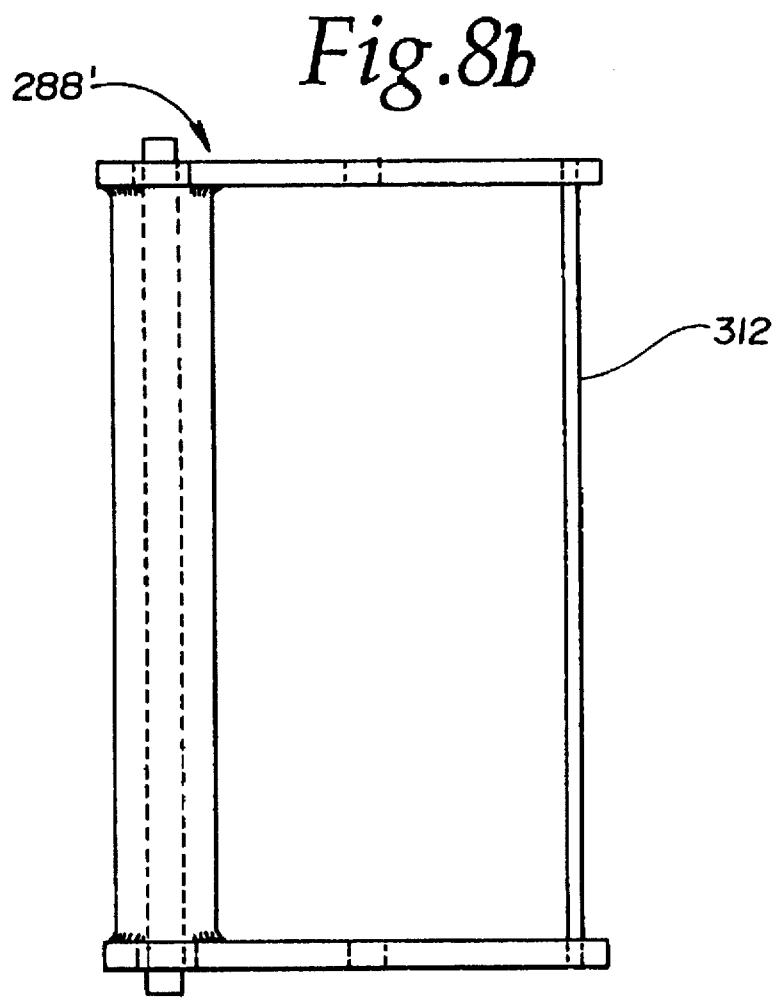
FIG. 8b is a top view of a laminator input dancer.
Figure 8C:
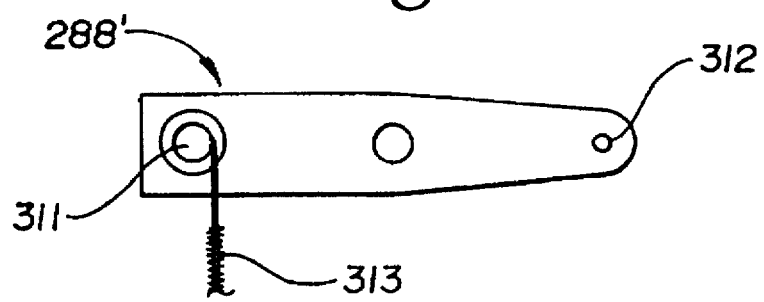
FIG. 8c is a side view of a laminator input dancer.

Laminator input dancer, shown in various detail and embodiments in FIG. 3a as 173, FIG. 8a as 288, and FIGS. 3b, 8b, and 8c as 288', provides tension on film 25 or similar media. This reduces slack in the film, tracks the material, and promotes unwrinkled lamination of film 25 with sheeting 28. The operation of laminator input dancer assembly may also provide sheeting speed of travel information to control the motor on laminator assembly 120, as discussed further below.

In the embodiment of FIG. 3a, sheeting reel assembly 141 is shown dispensing retroreflective sheeting 28 via optional tensioner and auxiliary unwind mechanism 148 to laminator assembly 120. Sheeting 28 may have an adhesive layer which is protected by liner 138. This liner is removed at selected location 150 and rewound on reel 134. Laminator assembly 120 comprises adjustment means and drive means for optimizing the positioning and tension on the sheeting materials.

Figure 10:
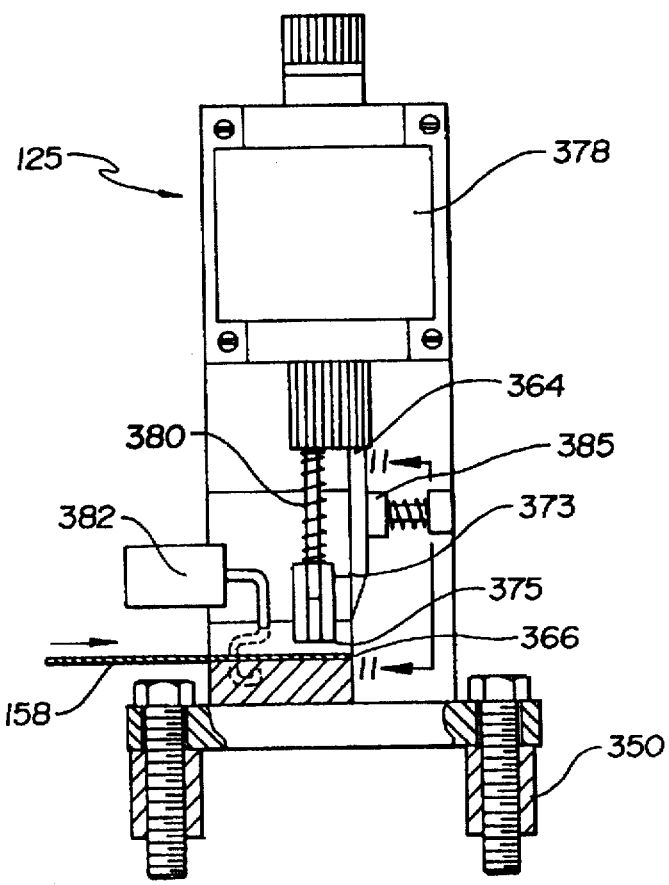
Figure 11:
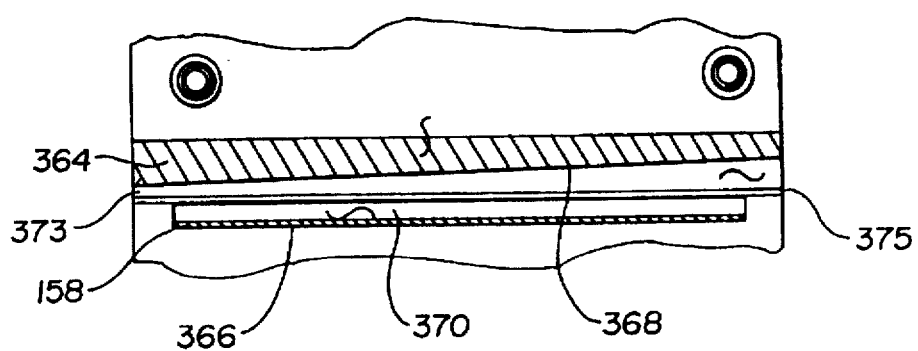
FIG. 11 is a front view of a sheeter assembly section taken along line 11—11 in FIG. 10.

Particular problems are encountered when trying to cut sheeting which is moving through equipment. These problems are further complicated by sheeting having a layer of adhesive. One of the problems that is associated with cutting is the characteristic of relatively poor printing capability when a printable media is repeatedly started and stopped to enable cutting. It is most preferable to have continuous printing, or if stoppage of the sheeting must occur, then to design the stoppage synchronous with end of print or non-print periods. Another possible solution to this problem is to use a rotary cutter mechanism. However, rotary cutters require expensive timing mechanisms and are time consuming to sharpen. In contrast, sheeter assembly 125 comprises a very efficient mechanism for sheeting operations. Sheeter assembly 125 is easily removed for blade sharpening, other maintenance, or replacement. FIGS. 10 and 11 provide further disclosure of embodiments of sheeter assembly 125.

If products produced by printing system 10 are to be cut into sheets, then sheeter assembly 125 will likely comprise a final step in the process of the system. However, if a roll form of product is required, then product rewind reel assembly 153 may be used.

Figure 6:
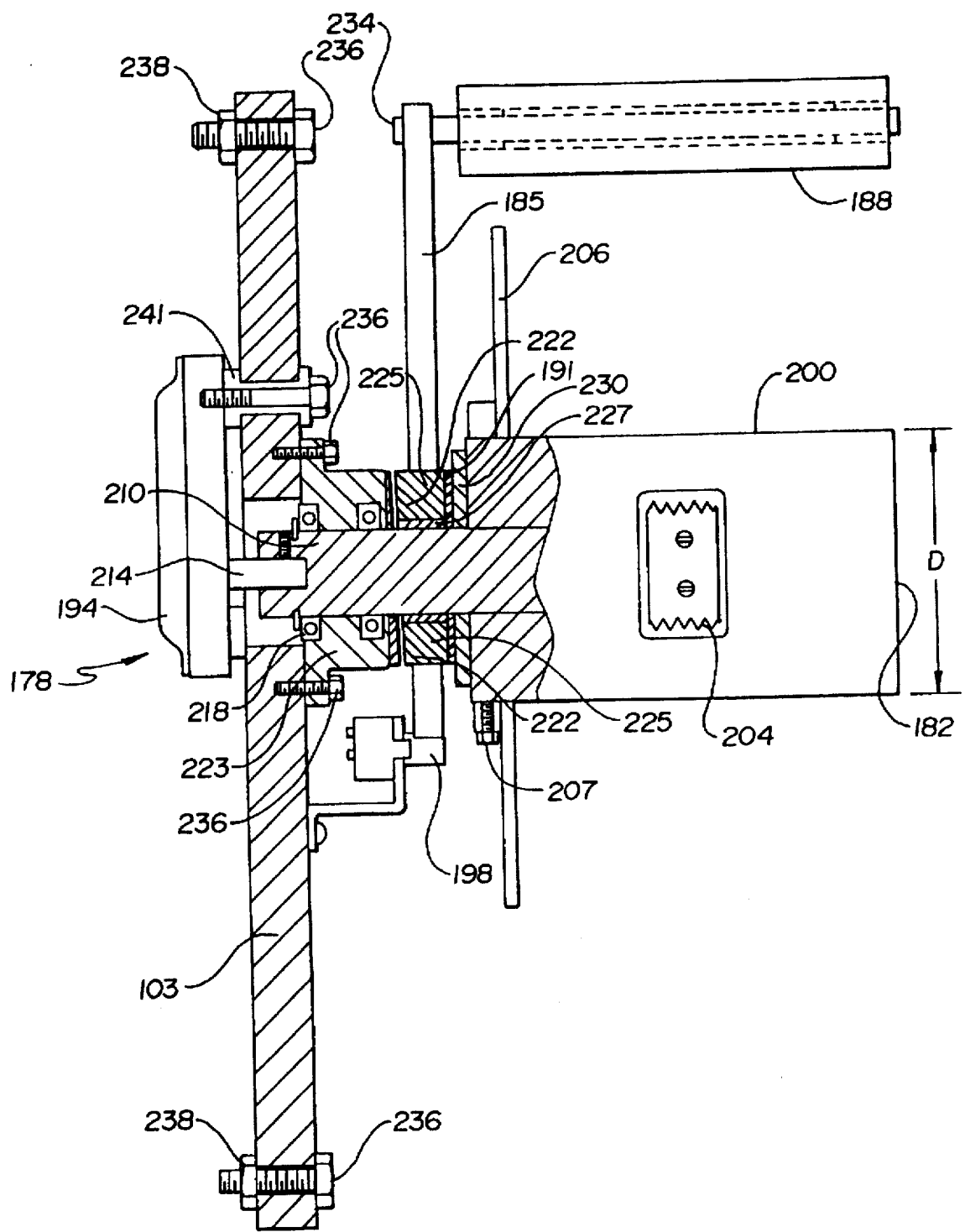
FIG. 6 is a side section view of a vertical rail member and a reel assembly.

FIG. 6 discloses a side section view of vertical rail member 103 and a reel assembly 178, such as printable film reel assembly 128 or sheeting reel assembly 141. Reel assembly 178 preferably comprises mandrel 182, arm 185, dancer 188, brake mechanism 191, electric drive means 194, and positioner 198. Mandrel 182 is designed for mounting a core of rolled material on outer surface 200 for dispensing and use in printing system 10. A preferred mandrel comprises material suitable for holding a roll of material while also affording optimum transportability of the system components. For example, mandrel 182 may comprise aluminum with a three inch diameter D and a stainless steel shim 204 for properly retaining a roll of material on the mandrel. Instead of using a shim, a mandrel might have a flat section suitable for use with a core holder rod to retain a roll of material on the mandrel. Backstop means 206 and hand screw flange 207 provide end alignment of material mounted on the mandrel. Stainless steel drill rod 210 provides sturdy support for mandrel 182 as well as connection with drive shaft 214. Drill rod 210 is supported by bearing assembly 218, which may comprise a cantilever type bearing assembly, as shown in FIG. 6.

Brake mechanism 191, and the positioner 198 may be used in combination, singly, or not at all depending on the configuration of printing system 10. As shown in FIG. 6, brake mechanism 191 functions to provide braking means for preventing overspeed damage as well as to prevent unnecessary unwinding of sheeting mounted on mandrel 182. Although a plurality of brake mechanisms may be effectively utilized, a preferred brake mechanism comprises wedge washer arrangement 222 in combination with bearing wedge block 225 surrounding shaft bearing 227. Bearing wedge block 225 comprises brake material adhesively applied to effect braking action. Shaft bearing 227 floats on drill rod 210. Wedge washer arrangement 222 is mechanically fastened to cantilevered bearing block 223. Fixed bearing washer 230 provides further functional interaction as part of brake mechanism 191. In an alternate embodiment, web/sheeting tensioning may be accomplished by use of linear spring mechanisms which would be preferably configured off of arm 185, or coil spring mechanisms which would be preferably configured around bearing assembly 218 and connected to a fixed member and to arm 185.

Positioner 198 comprises potentiometer means for determining the position of arm 185 at any time, permitting positive or negative drive to be applied to drive means 194. Drive means 194 preferably comprises a drive motor, such as a DC servomotor, and is used to control dancer 188. If a drive motor is used then it may be preferable to utilize either a float or flexible coupler arrangement in cooperation with the motor in order to take up any torque and possible misalignment. It is recognized, however, that certain flexible couplings could add unwanted size to the assembly and require protective coverings. If a drive motor is not used, then positioner 198 is likely to be of no use and may be removed from the system.

Dancer 188 is preferably constructed of a durable yet light weight material, such as aluminum, Delron® brand polymer, Teflon® brand plastic, or various polymers. Dancer 188 is preferably attached to arm 185 using drill rod 234 preferably manufactured from a very durable stock material. Reel assembly 178 is attached to vertical rail member 103 with a plurality of bolts 236 and washer/shim material 238. The washer/shim material 238 at a top and bottom portion of vertical rail member 103 provides excellent tramming for system alignment and orientation with a minimum of effort. Rubber grommets 241 overcome misalignment between motor drive shaft 214 and mandrel drive shaft drill rod 210.

Figure 7:
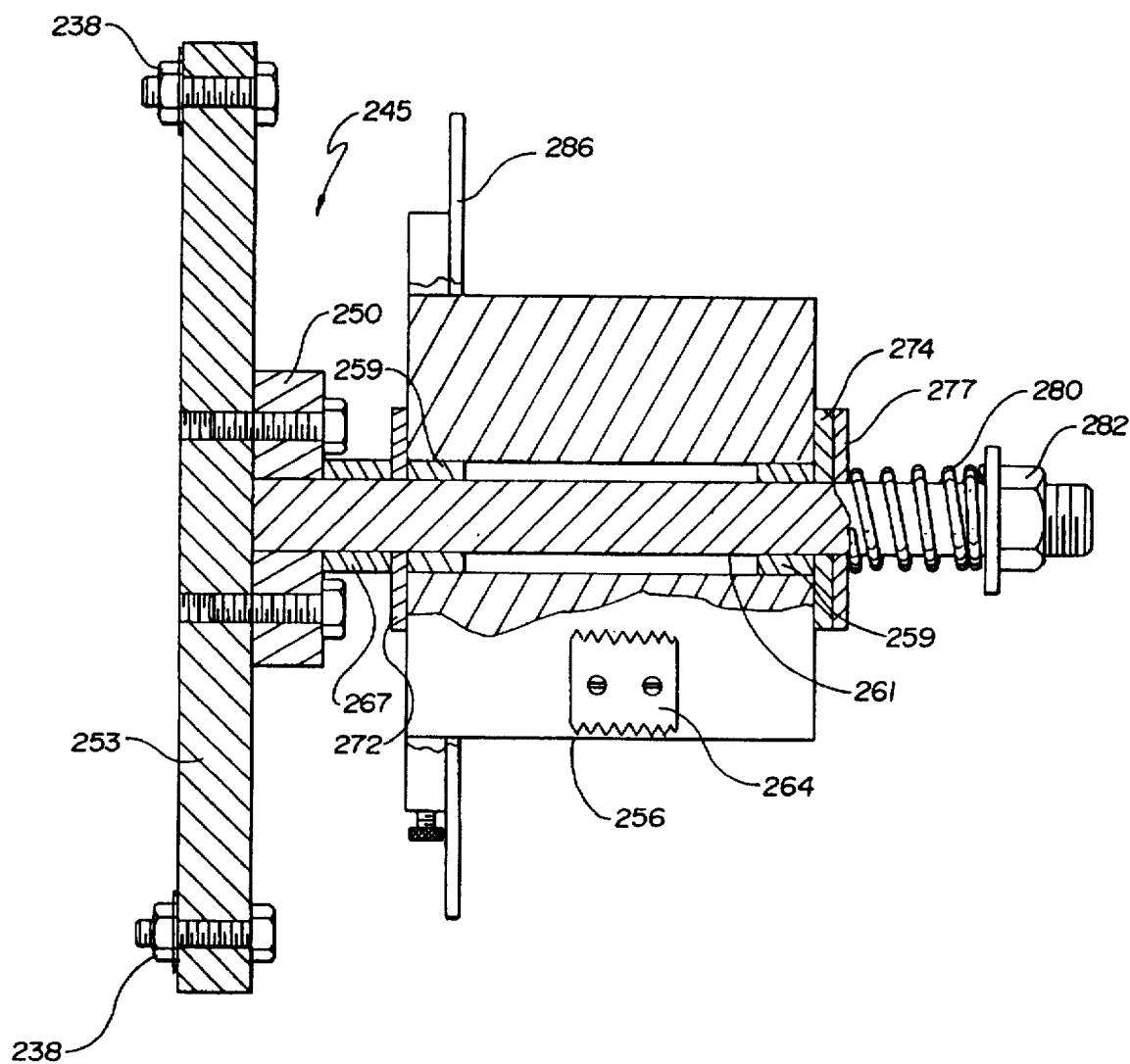
FIG. 7 is a side section view of a reel assembly connected to a mounting plate by a shaft block.

FIG. 7 discloses an alternate embodiment reel assembly 245 connected via shaft block 250 to a mounting plate portion 253, which may comprise a portion of or be attached to vertical rail member 103. In the embodiment disclosed in FIG. 7, core mandrel 256 is supported by mandrel bearings 259 on mandrel shaft 261. A core spring grip 264 provides means for securing a roll of material on core mandrel 256. Axial support and positioning is provided by spacer 267, thrust bearing 272, brake pad washer 274, and pressure washer 277. Pressure washer 277 is preferably keyed to mandrel shaft 261 to allow movement in a shaft axial direction but to prevent rotation. Biasing means 280 and adjustable nut 282 provide spring load support to pressure washer 277 and permit preset spring compression braking action to occur to prevent overspeed or unwanted rotation of core mandrel 256. Additional features of FIG. 7 include adjustable backstop 286 for support of a roll of material on the core mandrel, and washer/shim material 238, again provided for proper alignment and tramming of the assembly. The embodiment of FIG. 7 in which an adjustable nut 282 is used to control resilient biasing and to create drag is useful only until an approximate ratio of initial to final roll size of material is less than about 3 to 1. When the initial to final roll size ratio exceeds about 3 to 1, then alternate braking means, such as that shown in FIG. 6 are preferred.

FIG. 8a discloses one embodiment of laminator input dancer assembly 286 comprising dancer 288, which is substantially similar in construction and use to dancer 188 described above. Dancer 288 is connected by rod 291 to arm 294. Laminator input dancer assembly 286 is preferably provided with upward tension by use of a wound spring arrangement (not shown) and positioning means 297. Arm 294 is connected via hub 300 and support bearing 302 to shaft 305. Positioning means 297 senses the location of arm 294 and permits regulation of spring tension to optimize operation. Washer/shim material 238 also is provided for tramming, as necessary.

FIGS. 8b and 8c are other embodiments of a dancer assembly 288' configured for placement within the laminator assembly as shown in FIG. 3b. This internal configuration maximizes the angle of entry of printable film 25 onto a laminator roller. Dancer assembly 288' comprises dancer rotation rod 311 positioned so that dancer roller 312 optimizes the control of sheeting while permitting virtual abutting placement of printer 20 against laminator assembly 120. In particular, this anti-steering feature maximizes the wrap of the film on the appropriate laminator roll which reduces the tendency for axial movement of material on the various rolls. Such movement is caused in printing/lamination type systems, in part, by operation of laminator rewind mechanisms. This further enhances the compactness and improves operation of system 10. However, this close relation of the laminator assembly and the printer also requires a high torque drive system, a capability for matching the speed of a film 25 with sheeting 28, and maintaining the matched speeds of the different substrates during operation. Potentiometer mechanism 313 is connected between rotation rod 311 and a side portion of laminator 120. This permits accurate electrical feedback to control the position/speed relation of dancer assembly 288' and film 25.

Figure 9:
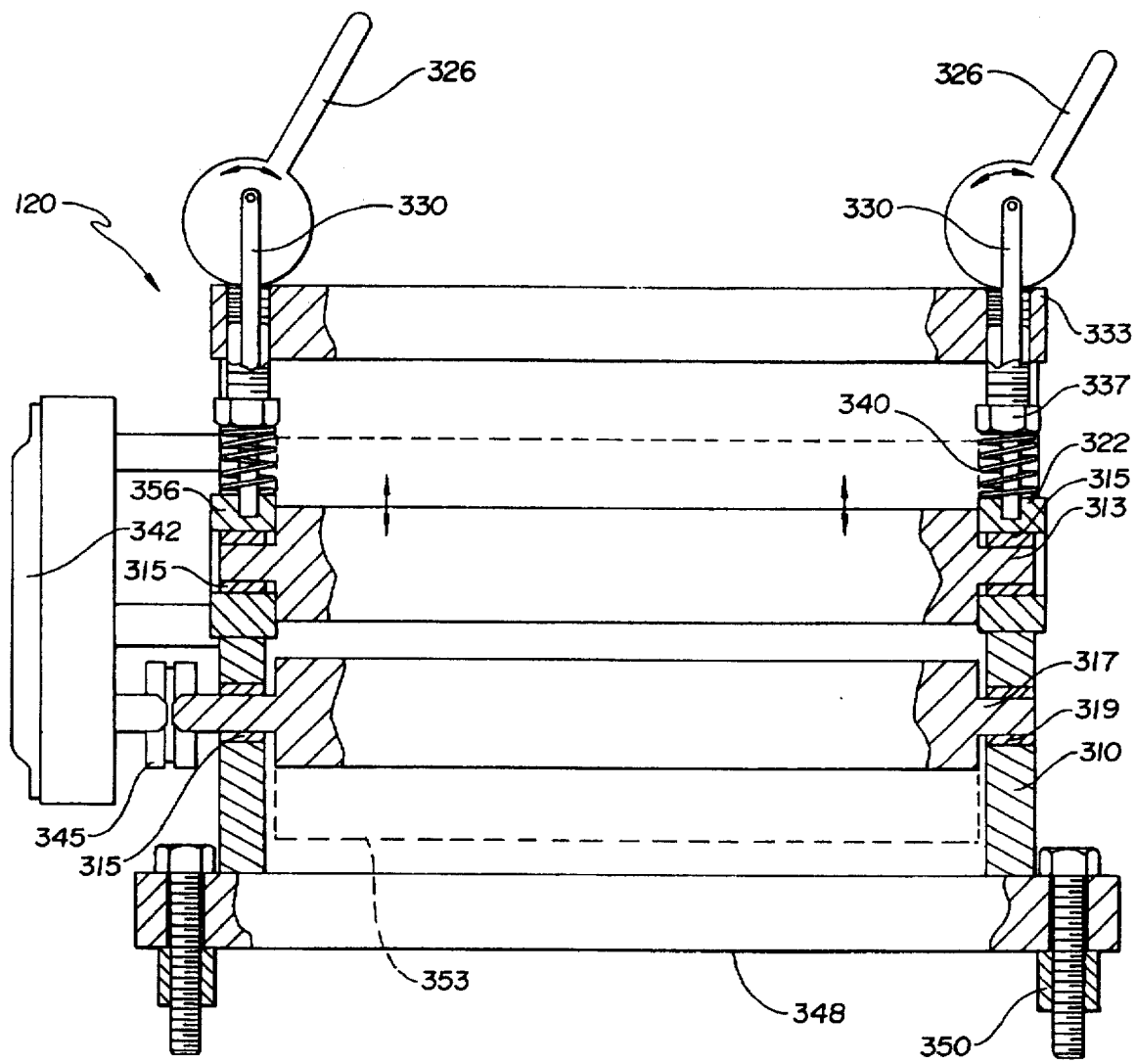

FIG. 9 is a side section view of one embodiment laminator assembly 120 taken generally along line 9—9 of FIG. 3a. In this embodiment, a pair of side supports 310 provide support means for idler pressure roll 313 and driven roll 317. Support bearings 319 provide support for driven roll 317 and idler pressure roll 313. Idler pressure roll sliding block 322 provides means for raising and lowering roll 313 and to adjust idler pressure roll pressure.

Idler pressure roll 313 is also vertically adjustable relative to driven roll 317. Although various liftlink means are suitable, in this embodiment use of a cam mechanism permits the vertical movement of idler pressure roll. In particular, roll lift cam 326, or a plurality of roll lift cams, is rotated relative to idler pressure roll lift shaft 330. Motion of roll lift cam 326 permits the vertical motion of floating bearing blocks 356 relative to top support 333, idler pressure roll adjustment nut 337, and biasing means 340. Drive means 342 is connected to driven roller 317 via flexible motor coupling 345. Base support 348 is connected to a horizontal rail member of printing system 10 using bolts and shim/spacer means 350 to enhance tram adjustments and/or height adjustments.

FIG. 10 is a side elevation view of one embodiment of sheeter assembly 125. Sheeter assembly 125 preferably comprises means for providing a scissor-like cut to the continuously moving sheeting material. It is important to provide a substantially continuous running web or sheeting material until the precise moment when a cutter blade engages the sheeting. However, the continuous action of the sheeting before it enters the sheeter assembly is maintained, as described below. Knife blade 364 is arranged, as shown in FIGS. 10 and 11 above an anvil edge 366. Knife blade edge 368 is slanted or angled relative to anvil edge 366, which permits progressive cutting of material passing through sheeter assembly 120 cutting port 370 as knife blade edge 368 engages the material from left to right, as shown in FIG. 11. Clamp member 373 and clamp pad 375 provide means for short duration stoppage of the portion of sheeting 158 which is about to be cut.

Movement of knife blade 364 relative to anvil edge 366 is provided, in this embodiment, by action of a sensing and control subsystem comprised of solenoid 378, biasing means 380 and sensing means 382. In operation, as sensing means 382 senses predicted indicia or a time mark, solenoid 378 is actuated to force knife blade 364 downward in a cutting motion toward anvil edge 366. Although sheeter assembly 125 is designed to be relatively compact and lightweight, it is possible to achieve greater than about 30 lbs of downward pressure at the cutting point while maintaining a relatively small size and weight through use of the novel combination of solenoid 378 and slanted knife blade 364. This combination provides excellent cutting capability with substantially no stoppage to the continuous motion of sheeting material 158 passing through printing system 10. A spring slide system 385 permits accurate alignment of knife blade 364 as it moves in response to action of solenoid 378 and biasing means 380. Shim/spacer means 350 maintains tram and alignment of the assembly with the remainder of printing system 10 components. Portions of the cutting structures may comprise optional recesses to prevent any adhesive buildup from interfering with blade operation.

The embodiment of sheeter assembly 125 shown in FIG. 3b comprises a preferred arrangement of dual solenoids 378 connected by return springs with the cutter blade arrangement and the assembly frame. Use of dual solenoids to actuate the blade cut results in very linear action of the blade, which further improves control, particularly when compared with a stepper motor type of cutter system. Shock mitigating bumpers also may be provided to isolate the action of the blade operation from the printer operation.

Another component of printing system 10 comprises an optional strip indicia applicator assembly. FIG. 12 discloses one embodiment of strip indicia applicator assembly 171 in which a supply roll 390 of pre-printed indicia, for example, die cut labels, having gaps between indicia labels is provided along with a means for removing the indicia labels from the liner and liner windup means 392. Supply roll 390 provides a supply of liner 395 having the pre-printed and optionally pre-cut label indicia thereon. Liner 395 passes side roller 397 and encounters liner stripping anvil 400 which separates the indicia from the liner. The stripped liner 402 passes around a distal end 404 of liner stripping anvil 400 and returns to a roll form of indicia-free liner 406. The indicia, such as labels 410, are guided by air jet means 412 into indicia guide channel 414. Labels 410 are each then guided onto printable film 25 just prior to passage through rolls 418, which may comprise non-driven soft rubber or polymer rolls.

In operation, gap sensor 421 is preferably configured to sense either clear stock or no stock, the latter providing indication of a gap in the material passing the sensor. Although other means of synchronous operation are possible using sensing means, gap sensor 421 provides one embodiment of a simple method of providing coordination between liner feed and liner rewind operation. A liner windup motor is started by a mark sensor 424 sensing a mark or predicted indicia on printable film 25, then a liner drive motor is fed high current for a period of time or receives pulses from a motor encoder until label 410 is attached to the printable film 25. The current is then reduced so that the web pulls the supply roll and the liner tension is minimal. Gap sensor 421 then stops the process, and resets for the next process. The particular configuration disclosed in FIG. 12 of optional strip indicia applicator assembly 171 is quite advantageous over other systems in view of non-contact with any adhesive which may reside on labels 410.

Figure 13:
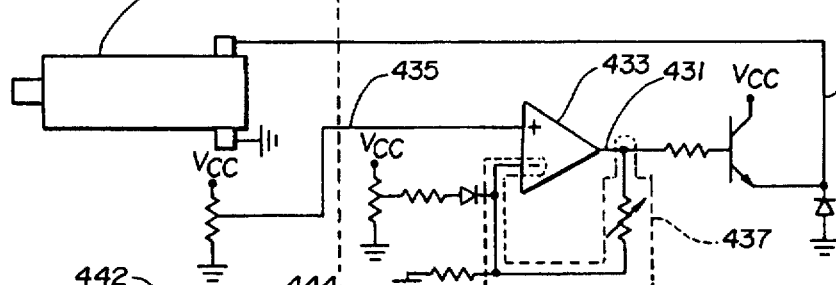
FIG. 13 is a schematic view of a simplified electrical circuit diagram of one embodiment of reel assembly drive means power supply.

Referring now to FIG. 13, a simple circuit diagram discloses one embodiment of reel assembly drive means power supplies. As shown in circuit 427, reel drive motor 429 voltage is controlled by output 431 of voltage comparator 433 which functions as a drive power resistor which allows the necessary voltage to maintain dancer assembly position constant. Voltage comparator 433, which is actually an operational amplifier, receives potentiometer voltage output 435 indicating location of dancer mechanisms or similar components. A representative operational amplifier is an LM 324 sold by National Semiconductor Corporation. Feedback loop/gain control circuit 437 provides means for comparing a minimum voltage relative to potentiometer voltage output.

Figure 14:
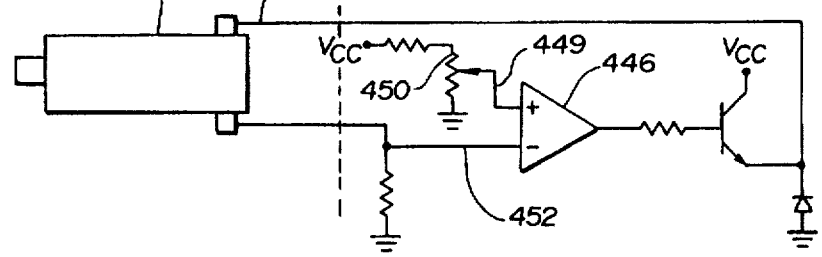
FIG. 14 is a schematic view of a simplified electrical circuit diagram of one embodiment of takeup drive motor power supply means.

FIG. 14 is a simplified circuit diagram 440 disclosing one embodiment of current controlled takeup drive motor power supply means. Takeup drive motor 442 receives constant voltage input 444 from the output of comparator 446. Comparator 446 generates the constant voltage by comparing pre-set current 449 of current adjustable potentiometer 450 with the output voltage 452 of motor 442. The voltage drop across the low ohm of resistor produced the measured current which is compared to the pre-set current to supply the output voltage which is, therefor, referenced to a current.

Figure 15:
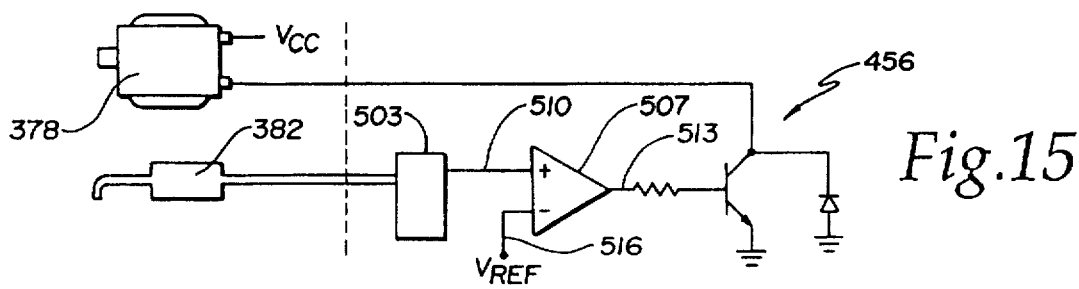
FIG. 15 is a schematic view of a simplified electrical diagram of a sensing and control subsystem related to the sheeter assembly.

FIG. 15 discloses a simplified electrical diagram of the sensing and control subsystem related to the sheeter assembly 125. In this figure, circuit 456 discloses solenoid 378, sensing means 382, one shot mark sensor drive 503, and comparator 507. In operation, sensing means 382 signals one shot mark sensor drive 503 which outputs a signal 510 to comparator 507. The output 513 of comparator 507 is derived from the input voltage 510 relative to the reference voltage 516. Output of power transistor 513 signals actuation of solenoid 378.

A particular problem in known printing/lamination systems is that of erratic movement or jerking of sheetings passing through the systems. Printing system 10 overcomes these problems by maintaining a suitable tension in the sheetings, for example, by use of dancer assemblies as described above, and maintaining a high torque in roller drive motors to permit rapid acceleration and rapid response to system changes. This requires sensitive gain control subsystems, and utilization of motor drives which are direct current only. This facilitates smooth and rapid response. More particularly, preferred direct current motors comprise gear driven flat and compact motors which provide good control of torque at key points in the manufacturing process, for example, at the point of liner separation, e.g., location 150, and other locations. Examples of preferred motors include direct current servomotors known as ferrite gearmotors sold under the model numbers 9FG/25:1(windup reel assemblies) and 9FGHD/50:1(laminator assembly) by PMI Motion Technologies, Incorporated. These motors have zero clogging for smooth operation, low inertia to provide fast acceleration and rapid response to command signals, and comprise a large number of poles while having a very light armature. Each motor has an overall weight of less than about 3.4 pounds. These features further enhance the response time of these motors and maintain a constant, linear, non-jerking movement of the sheetings passing through printing system 10. The direct current electric motor for use with the laminator assembly comprises continuous torque values in a range of between 30 inch-pounds (3.4 Newtons-meter) and 50 inch-pounds (5.6 Newtons-meter), and a high torque value of about 208 inch-pounds (23.5 Newtons-meter) to provide rapid response to printing system demands.

System 10 may be operated with alternating current power supplies which may vary depending on the capability and availability of a power converter. For example, the system may use either a 110 volt or 220 volt supply and requires only a one ampere power supply for operation with an inkjet style printer. Use of a thermal transfer printer may require up to about a 10 ampere rating.

Additional advantageous features of system 10 include feedback and control means for controlling the cutter operation according to the final position of the dancer assembly to prevent cutter blade operation when the sheeting is not traveling at the correct speed. This and other features relating to a "mark sensor" type of cutter and printer interaction prevents accumulated errors from resulting in poor registration and improper cutting. This results in improved waste prevention, improved productivity, a minimizing of cutter wear, and increased system control. Other optional features include use of tack rags or vanadium pentoxide conductors which remove static from printable film 25, and use of optional weights or antibuckling blankets configured between laminator assembly 120 and sheeter assembly 125.

Figure 2:
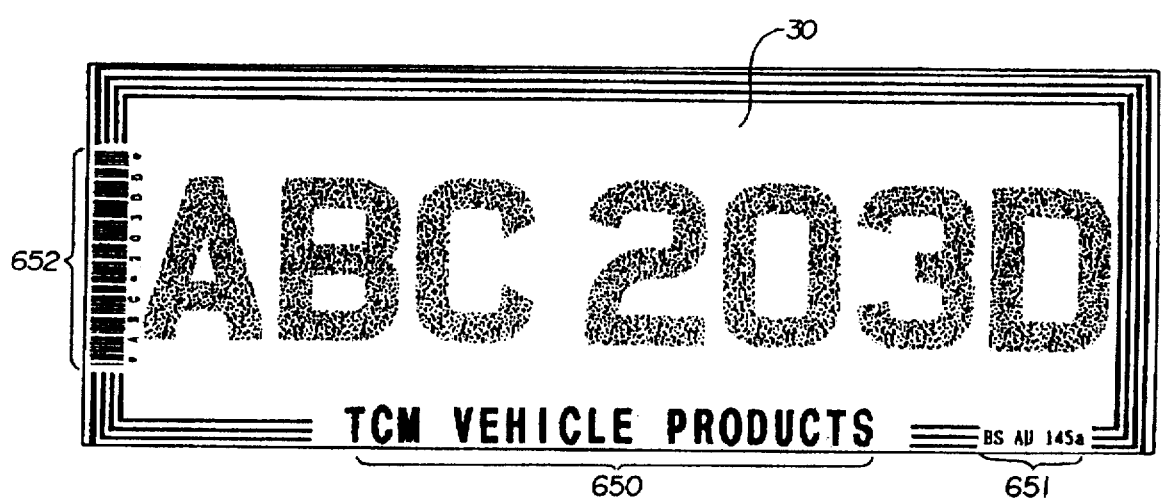
FIG. 2 is a plan view of retroreflective sheeting in accordance with the present invention produced by the system shown in FIG. 1.

FIG. 2 discloses a representative finished product sheeting 30 manufactured using printing system 10. A variety of products having different characteristics may be efficiently and durably manufactured using printing system 10. Principal advantages of printing system 10 include its portability and cost, as well as its exceptional capability of manufacturing retroreflective sheeting products at a high rate of speed and printing a highly variable data display on each product. For example, referring to FIG. 2, the letter/number combination of characters on a typical license plate may vary from five to eight depending on the country and region where the license plate is used. This alone creates a significant amount of data change on each license plate. However, printing system 10 provides means for printing not only a very efficient and high speed alpha-numeric license plate sheeting combination, but also the ability to incorporate other data, such as manufacturer's identification data represented by the indicia within region 650 or additional regions such as region 651 or region 652. Manufacturer identification data may include: the vehicle identification number; the year, make, and model of the motor vehicle; the owner of the motor vehicle; the insurance company who insures the vehicle; and any other information useful to the state where the vehicle operates.

Figure 16:
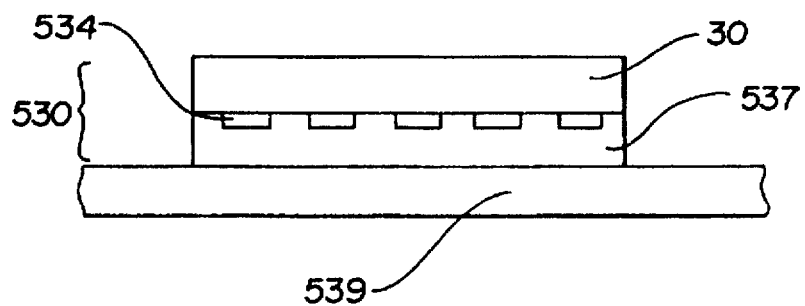
FIG. 16 is a side section schematic view of a printed sheeting product produced by the printing system in accordance with the present invention.
Figure 17:
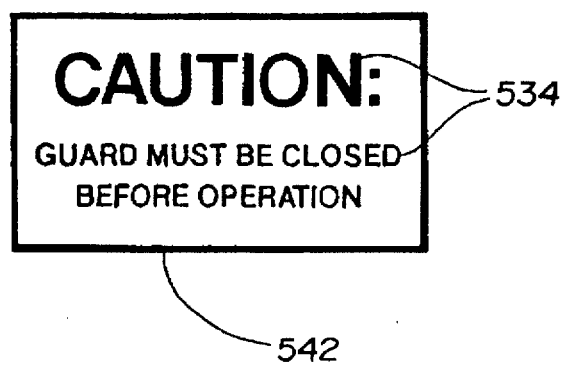
FIG. 17 is a plan view of a portion of a printed sheeting product in accordance with the present invention similar to that shown in FIG. 16.
Figure 18:
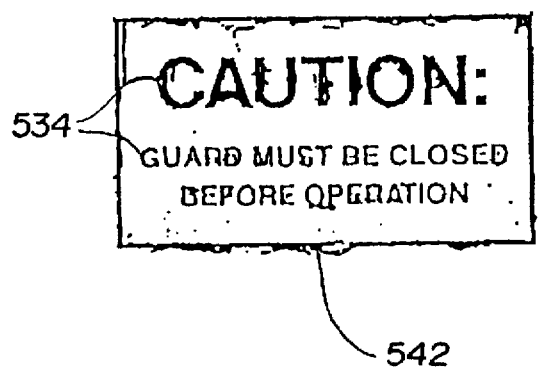
FIG. 18 is a plan view of the printed sheeting product shown in FIG. 17 in which the indicia is delaminated and distorted after removal of the product from a substrate.

High speed production of retroreflective sheeting with highly variable data/indicia printed either on the sheeting or on a film attached to the sheeting provides great advantage to the portable printing system of the invention. In addition, the design of the printing system is quite conducive to producing retroreflective sheeting products, such as printed retroreflective sheeting product 530 shown in FIG. 16. Product 530 discloses retroreflective printable film 30 which may be printed directly with alpha-numeric data 534 and then coated with an adhesive 537 such as a pressure sensitive adhesive. Product 530 is preferably printed with a wax-based colorant/binder, as described above, and is designed for attachment directly to a transparent substrate, such as a motor vehicle window. A preferred wax comprises a soft wax with a low applied melting temperature. The wax binder and colorant from thermal transfer ribbon 22 is absorbed by and/or is migrated into and/or is attached to both the printable film and the adhesive layer. This results in an advantageous lack of complete adherence of the colorant/binder to the film, making separation of retroreflective sheeting product 530 from the transparent substrate 539 very difficult, if not impossible, without causing some distortion to the printing. This is achieved without use of any release coating or similar preparation being applied to the film. The invention works particularly well for those wax-based colorant/binder combinations having high wax content. An attempt to remove product 530 from the surface to which it is attached will render the product non-transferable to another or secondary substrate because the thermally printed data will be recognizably distorted. FIG. 17 discloses a portion 542 of product 530 (FIG. 16) which has been printed according to the above description using system 10 (FIG. 17). In contrast, FIG. 18 discloses portion 542 which has been delaminated and distorted after attempted removal of the product from its original adhesive attachment site or primary substrate.

Another embodiment of product 530 manufactured with system 10 (FIG. 1) is schematically shown in FIG. 19, in which retroreflective printable film 25 comprises alpha-numeric data 534 which is either variable or non-variable data that has been printed on facing surface 545. For example, alpha-numeric data 534 may comprise data that varies in whole or in part with each product, such as U7S N2A or U6S N4A, and the like. Sheeting 28 comprises an adhesive backed removable liner which is removed prior to applying the adhesive layer 537 (which has been transferred to cover facing surface 545 and data 534) to the substrate, such as a window, for which product 530 is intended to be affixed in a manner which will cause residual evidence in the article when an attempt is made to remove, alter, or otherwise deliberately tamper with it. Such residual evidence preferably includes, tearing, cracking, stretching or deformation suitable for detection by the unaided human eye although a machine detectable embodiment may also be suitable in some applications, for example, such as with bar code scanners.

FIG. 20 discloses another embodiment of a useful, secure, information product manufactured by printing system 10, which utilizes the system advantages of high speed production of high variability printed data as well as very low cost manufacturing processes and equipment. Printed retroreflective sheeting product 552 is substantially similar in structure to product 530, and comprises retroreflective printable film 30, and a pressure sensitive adhesive layer 537 transferable from sheeting 25 (28 in FIG. 1), which comprises a removable liner. In this embodiment, sheeting section 556 may be either die cut to separate it from removable sheeting peripheral portion 558 or it may first be directly printed onto by printing means associated with printing system 10. Either sequence is acceptable provided that section 556 receives printed indicia on top face 561. Peripheral portion 558 is then removed by the product user, and the product 552 is then placed against a transparent substrate, such as window glass.

Figure 25:
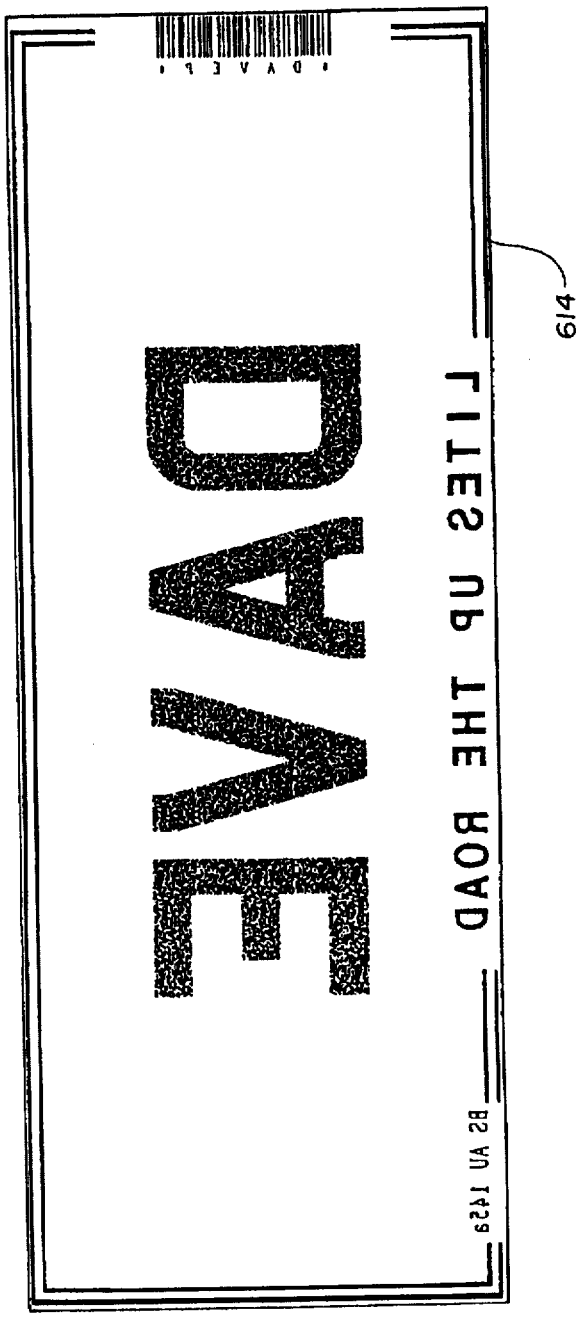
FIG. 25 is a plan view of an embodiment of a mirror image printed sheeting product in accordance with the present invention.

FIG. 21 discloses another embodiment of a useful, secure, information product 566 which may be efficiently manufactured utilizing print system 10 (FIG. 1) to achieve the optimum benefits of a low cost manufacturing system and a process capable of very high speed, high data rate, and high data rate variability print requirements. It is recognized that this and other embodiments might, in the future, actually be structurally arranged according to this invention using less efficient alternate manufacturing systems or alternate manufacturing systems which create the structures disclosed but are able to do so because one of the limitations noted above is not present in the particular design of the product or the printed indicia. Product 566 is preferably manufactured by mirror or reverse image printing indicia 569 onto a transparent printable film 25. By "reverse image printing" is meant the application of indicia which has its parts reversed with respect to an essentially similar but non-superimposable representation of the indicia, as if viewed in a mirror. After formation of the reverse image, an adhesive layer 572 is laminated over indicia 569 and printable film 25. The product is then provided to a user for direct application onto a smooth substrate 575 such as a window or vehicle body. FIG. 25 discloses one embodiment of a product 614 which may be efficiently manufactured in this manner.

FIG. 22 discloses an alternate embodiment printed sheeting product 580. In this embodiment, product 580 comprises the layers of product 566 but with an additional layer 583 which may comprise either a retroreflective or non-retroreflective material, as well as at least one cutout region 587 which permits direct contact of adhesive layer 572 with substrate 590. In addition to indicia 569, indicia 591 may be applied just prior to the application of product 580 to substrate 590, such as by means of a pen, typewriter, or other marker. This feature further contributes to the highly tailorable attributes of product 580 by permitting very localized and temporal indicia to be applied to the product. For example, indicia 591 might be a date or time mark applied by a parking lot attendant to denote time of entry into a parking facility. As shown in FIG. 22, substrate 590 to which product 580 is being affixed may comprise a smooth or a non-smooth substrate, with the latter represented by irregular surface 592, which may comprise a vehicle body corrugation or non-smooth projection of the vehicle body surface, or similar surface.

FIG. 23 discloses an alternate embodiment secure information product which is essentially identical to product 580 but which is applied to a smooth surface, permitting contact of adhesive layer 572, in part, with a portion of substrate 590. This is accomplished by adhesive layer 572 actually sagging, surging, or otherwise pressing against substrate 590 rather than being penetrated by a protrusion of substrate 590. One example of a particular adhesive which demonstrates excellent properties for use with products 530, 552, 566, and 580 is manufactured as Scotch™ Brand Protected Graphics System Laminating Adhesive No. 9457, by Minnesota Mining and Manufacturing Company of St. Paul, Minn. This adhesive provides excellent adhesion characteristics while maintaining very low shear strength.

Use of the above secure information products obviates the need for using weak adhesion pre-layers, as currently required by some validation or secure information products, such as stickers. Instead, the invention utilizes the print layer/indicia layer itself as a weak adhesion layer. Again, this results in the uneven and used appearance of the product after it has been removed from contact with a substrate where the printed indicia, which is preferably a soft wax substrate thermally transferred from a ribbon, is marred due to its uneven removal from the substrate.

It is recognized that in the above-described products of the invention, either a printable film region or a retroreflective sheeting region may comprise areas for pre-printed information such as consecutive numbering, logos, water marks, other anti-counterfeiting measures or general information. A combination of that information plus other printable indicia, possibly applied with different types of printing systems, permits manufacture of combination products such as secure information product 600 disclosed in FIG. 24. Product 600 is one example of multiple zones of different types of indicia, different types of sheeting layering, and different colors. For example, in an actual product 600, the region 603 may comprise a first color, region 605 may comprise a second color, region 607 may comprise a third color, and the alpha-numeric indicia may comprise varied colors. It is also recognized that the various regions may also comprise different sheeting material, which permits retroreflective backgrounds or lack thereof to provide contrast to the indicia on product 600. Product 600 also discloses use of bar code indicia 610, or other similar purpose densely packed highly variable information/indicia. This combination product is particularly useful in applications such as vehicle registrations or license plates. This type of product may even facilitate rapid through-put at toll or other highway check stations for vehicles equipped with remote scannable security information stickers such as product 600. This alone may provide substantial savings, permit alternate allocation of scarce highway administration funds, improve safety and security for operators of such vehicles, and improve the safety of citizens and police officers when utilized in cooperation with law enforcement programs. This would also permit increased automation and speed of content, weight, and registration verification at highway checkpoints for trucks and other vehicles.

Figure 24:
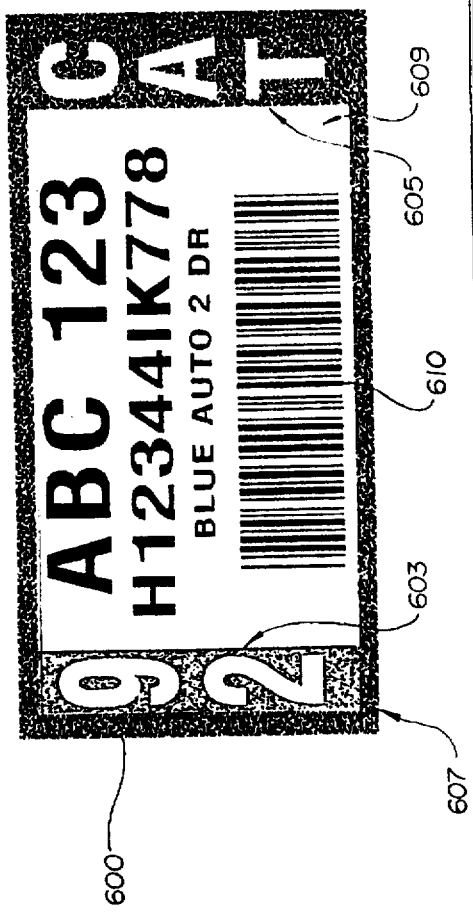
FIG. 24 is a plan view of a secure information retroreflective sheeting product in accordance with the present invention having multiple zones of different indicia.

All of the information which is shown as printed information on product 600 in FIG. 24 may be printed at high speed and low cost using the above embodiments of printing system 10 (FIG. 1). This information may be placed on substrates, such as stickers, which may be directly printed or mirror image printed, such as shown in the minor image product 614 of FIG. 25. The advantage of products manufactured similarly to product 600 and product 614 include the efficient continuous format production, using consecutive numbering for inventory control, and thermal transfer or inkjet printing at numerous vehicle dealer locations or other locations. This permits diversification of printing locations from a centralized location to numerous local sites in a very efficient and cost effective manner. In addition, products manufactured according to the above processes and with the above equipment assist authorities in detecting stolen vehicles and registration violations, and accomplish this through supplemental use of bar code reader/computer systems to enhance the safety of officers approaching vehicles having these registration stickers. A police officer or other government official or authorized person could obtain information from product 600 by pointing an information intake device or "gun" towards the product and pressing a button or otherwise instructing the device to read the information on the product. Product 614 may be retroreflective as shown in the embodiments discussed above to facilitate reading the information from a distance. Additionally, a combination of vehicle description paper card and validation stickers for the vehicle license plate or the window vehicle descriptor label could be produced for issuance in a single pass through printing system 10 for new vehicle registrations and license plate reissues if a complete vehicle registration system is desired. The customer, vehicle dealer, or state appointed agent could apply the label product to the vehicle with the preferred location being on the inside of a window.

It is recognized that the improved data display retroreflective sheeting processes and products of this invention include not only license plates and vehicular labels, but other uses such as street signs, security stickers, and the like. In particular, where a variety of information is desired to be used with retroreflective sheetings, or when any of the various manufacturing and recognition problems described above are to be overcome, then the new system of printing is preferred. In addition, use of printing system 10 with advanced computation means, such as software compatible with most personal computer systems, enables use of an enhanced character recognition system for enhancing the human readability of characters such as indicia on signage. Software and programming which provides enhanced character recognition includes isolation and identification algorithms suitable for avoiding confusing combinations of indicia, automatic print altering features which alter adjacent indicia that would otherwise provide a confusing or non-discernible appearance to a human eye, providing algorithms suitable for utilizing previously disallowed indicia or indicia combinations in order to use fewer alpha-numeric characters while simultaneously achieving a greater number of possible combinations of such indicia/characters, or providing advanced algorithmic support for mid-character string enhancements to optically advance the instantaneous viewing location further along an optical string rather than commencing the optical recognition at the beginning or end of a string. These and other advanced techniques of enhancing human character recognition of indicia on license plates and other signage dramatically increase the safety and security of users and observers of this signage, and are now made possible and affordable using the teachings of this invention.

Yet another aspect of the invention comprises use of thin film materials manufactured according to certain processes to improve retroreflective sheeting data display. Use of thinner film materials to manufacture high efficiency, high resolution retroreflective sheeting products is particularly useful in license plate and street signage markets. For example, FIG. 26 shows a section view of a typical license plate 620 manufactured in the United Kingdom. License plate 620 comprises a rigid transparent face layer 622 adhered over reflective sheeting 624 and adhesive layer 626 and cut letters/indicia 629. Additional adhesive 628 and a polyethyleneterephthalate (PET) backing film 631 complete the structure. License plate 620 clear face layer 622 has a thickness of about 2 mm to about 3 mm. This clear layer over the alpha numeric characters 70 provides an appearance of depth which is appealing to motorists. The disadvantages of this type of license plate include a very high cost to manufacture and a requirement that the rigid transparent face layer 622 be fairly thick in order to maintain its appearance and weather resistant characteristics. Typically, this face layer is manufactured using polymethyl methacrylate (PMMA) blanks which require a cumbersome, slow, and costly piece-work plate making process rather than a continuous process, and further cause layer 622 to fracture readily on impact.

Referring to FIG. 27, an improved construction license plate 636 is disclosed. License plate 636 comprises a relatively thinner PMMA film face layer 638 than layer 622 in FIG. 26, reflective sheeting 640, adhesive 643, alpha numeric lettering/indicia 646, adhesive layer 648, and relatively thicker backing and support layer 651 as compared with layer 631 in FIG. 26. Use of a relatively thick backing and support layer 651, preferably manufactured using aluminum or an acrylonitrile butadiene styrene (ABS) type material, provides the needed rigidity for license plate 636, while the use of thin film for face layer 638, preferably with a thickness of no greater than about about 0.1 mm, provides improved retroreflectivity as compared with the thicker layer 622 depicted in FIG. 26. In addition, the use of a thin film face layer of the type shown in FIG. 27 permits significant printing advantages. For example, although high volume manufacture of license plate 636 could possibly include use of printing methods such as electrographic printing shown in U.S. Pat. No. 5,085,918, which is incorporated herein by reference, a more decentralized manufacturing process utilizes printing system 10. License plate 636 permits lower cost manufacture through use of less costly materials, such as high density polyethylene (HDPE) or ABS, to provide most of the needed plate rigidity. Preferably such materials have a thickness of between about 2.2 millimeters and about 3.8 millimeters. In addition, lower cost may be achieved through use of inexpensive recycled materials to provide much of the needed plate rigidity. Other improvements include better control of finished plate brightness and appearance, processing advantages through use of a continuous process rather than a piece process, an improved impact resistance which promotes greater longevity of plates produced according to this process, and an increased volume of different data which may be placed onto the plates by use of the novel printing system 10 disclosed above.

We claim:

1. A method of making a durable, weather-resistant retroreflective article, the article having buried, readable indicia printed by a thermal printer, comprising the steps of:
   a) providing first and second polymeric layers, one of said layers being retroreflective and one being non-retroreflective, one of said layers having at least one surface suitable for receiving print indicia from a thermal printer;
   b) providing a definition of an image to a computer, the image to be printed as indicia on said at least one surface by said printer;
   c) generating a computerized version of the image with the computer;
   d) employing the thermal printer to transfer the computerized version of the image to the at least one surface using a wax colorant/binder to form said print indicia; and
   e) adhering the first and second polymer layers together, so that the print indicia is positioned between the first and second layers.

2. The method of claim 1 wherein the computer and printer are able to reformat and print about 90 square centimeters to about 127 square centimeters per second of indicia onto said at least one surface.

3. The method of claim 1 wherein the color tone of the print indicia is controlled by varying the dwell time and/or temperature of said thermal printer.

4. The method of claim 1 wherein the print indicia is applied to said at least one surface as a mirror image of the indicia intended for viewing by users of the retroreflective article.

5. The method of claim 1 wherein the non-retroreflective layer is an adhesive layer and said at least one surface is a light-impinging surface of the retroreflective layer.

6. Method in accordance with claim 5 wherein the wax colorant/binder adheres to both the light impinging surface of the retroreflective layer and the adhesive layer.

7. Method in accordance with claim 6 further comprising applying a thin layer of polymethylmethacrylate to the adhesive layer.

8. Method in accordance with claim 7 further comprising adhering a backing to the retroreflective layer using a second adhesive layer.

9. Method in accordance with claim 1 further comprising substantially continuously moving the retroreflective article having buried, readable indicia therein through a sheeter assembly, the sheeter assembly comprising means for providing a scissor-like cut to the substantially continuously moving retroreflective article.

10. Method in accordance with claim 9 wherein the sheeter assembly comprises a knife blade and an anvil edge, the knife blade having a knife blade edge that is slanted relative to the anvil edge, the sheeter assembly further comprising a clamp member which provides means for short duration stoppage of the retroreflective article which is about to be cut.

11. Method in accordance with claim 10 wherein movement of the knife blade relative to the anvil edge is provided by action of a sensing and control subsystem comprising a solenoid, biasing means, and sensing means, wherein as the sensing means senses a predicted indicia or a time mark on the retroreflective article, the solenoid is actuated to force the knife downward in a cutting motion toward the anvil edge.

12. Method in accordance with claim 11 further comprising aligning the knife blade as it moves in response to the solenoid and biasing means.

13. Method in accordance with claim 5 comprising maintaining suitable tension in the retroreflective layer prior to adhering the retroreflective layer to the adhesive layer.

14. A method of making a combination secure information retroreflective article, the method comprising the steps of:
   a) supplying a previously printed retroreflective sheeting having nonvariable print indicia printed thereon;
   b) selecting a second sheeting material comprising a liner material having a die cut area and a peripheral area and having a pressure sensitive adhesive coating on one of its major surfaces;
   c) providing a definition of an image to a computer, the image to be printed as variable print indicia on said die cut area of the liner material by a thermal printer;
   d) generating a computerized version of the image with the computer;
   e) employing the thermal printer to transfer the computerized version of the image to the die cut area of the liner material using a wax colorant/binder to form said variable print indicia; and
   f) adhering the retroreflective sheeting to the pressure sensitive adhesive of the second sheeting material.

15. Method in accordance with claim 14 wherein the computer and printer are able reformat and print about 90 square centimeters to about 127 square centimeters per second of indicia onto the liner material.

16. The method of claim 14 wherein the color tone of the variable print indicia is controlled by varying the dwell time and/or temperature of the thermal printer.

17. The method of claim 14 wherein the variable print indicia is applied to said liner material as a mirror image of the indicia intended for viewing by users of the retroreflective article.

18. Method in accordance with claim 14 further comprising substantially continuously moving the combination secure information retroreflective article through a sheeter assembly, the sheeter assembly comprising means for providing a scissor-like cut to the substantially continuously moving retroreflective article.

19. Method in accordance with claim 18 wherein the sheeter assembly comprises a knife blade and an anvil edge, the knife blade having a knife blade edge that is slanted relative to the anvil edge, the sheeter assembly further comprising a clamp member which provides means for short duration stoppage of the retroreflective article which is about to be cut.

20. Method in accordance with claim 19 wherein movement of the knife blade relative to the anvil edge is provided by action of a sensing and control subsystem comprising a solenoid, biasing means, and sensing means, wherein as the sensing means senses a predicted indicia or a time mark on the retroreflective article, the solenoid is actuated to force the knife downward in a cutting motion toward the anvil edge.

21. Method in accordance with claim 20 further comprising aligning the knife blade as it moves in response to the solenoid and biasing means.

22. A method according to claim 1 wherein the thermal printer transfers a multi-color printed indicia onto the at least one surface.

23. A method according to claim 14 wherein the thermal printer transfers a multi-color variable print indicia onto the die cut area of the liner.

24. A method of making a durable, weather-resistant retroreflective article, the article having buried, readable indicia printed by an inkjet printer, comprising the steps of:

a) providing first and second polymeric layers, one of the layers being retroreflective and one being non-retroreflective, one of the layers having at least one surface suitable for receiving print indicia from an inkjet printer;

b) providing a definition of an image to a computer, the image to be printed as indicia on the at least one surface by the inkjet printer;

c) generating a computerized version of the image with the computer;

d) employing the inkjet printer to transfer the computerized version of the image to the at least one surface, thus forming the print indicia; and e) adhering the first and second polymer layers together, so that the print indicia is positioned between the first and second layers.

25. The method of claim 24 wherein the INKJET printer transfers a multi-color print indicia onto the at least one surface.

26. The method of claim 24 wherein the computer and printer are able to reformat and print about 90 square centimeters to about 127 square centimeters per second of indicia onto the at least one surface.

27. The method of claim 24 wherein the print indicia is applied to said at least one surface as a mirror image of the indicia intended for viewing by users of the retroreflective article.

28. The method of claim 24 wherein the non-retroreflective layer is an adhesive layer and said at least one surface is a light-impinging surface of the retroreflective layer.

29. The method of claim 28 wherein the print indicia adheres to both the light impinging surface of the retroreflective layer and the adhesive layer.

30. The method of claim 29 further comprising applying a thin layer of polymethylmethacrylate to the adhesive layer.

31. The method of claim 30 further comprising adhering a backing to the retroreflective layer using a second adhesive layer.

32. The method of claim 24 further comprising substantially continuously moving the retroreflective article having buried, readable indicia therein through a sheeter assembly, the sheeter assembly comprising means for providing a scissor-like cut to the continuously moving retroreflective article.

33. The method of claim 32 wherein the sheeter assembly comprises a knife blade and an anvil edge, the knife blade having a knife blade edge that is slanted relative to the anvil edge, the sheeter assembly further comprising a clamp member which provides means for short duration stoppage of the retroreflective article which is about to be cut.

34. The method of claim 33 wherein movement of the knife blade relative to the anvil edge is provided by action of a sensing and control subsystem comprising a solenoid, biasing means, and sensing means, wherein as the sensing means senses a predicted indicia or time mark on the retroreflective article, the solenoid is actuated to force the knife downward in a cutting motion toward the anvil edge.

35. The method of claim 34 further comprising aligning the knife blade as it moves in response to the solenoid and biasing means.

36. The method of claim 28 further comprising maintaining suitable tension in the retroreflective layer prior to adhering the retroreflective layer to the adhesive layer.

37. A method of making a combination secure information retroreflective article, the method comprising the steps of:

a) supplying a previously printed retroreflective sheeting having nonvariable print indicia printed thereon;

b) selecting a second sheeting material comprising a liner material having a die cut area and a peripheral area and having a pressure sensitive adhesive coating on one of its major surfaces;

c) providing a definition of an image to a computer, the image to be printed as variable print indicia on said die cut area of the liner material by an inkjet printer;

d) generating a computerized version of the image with the computer;

e) employing the inkjet printer to transfer the computerized version of the image to the die cut area of the liner material to form the variable print indicia; and f) adhering the retroreflective sheeting to the pressure sensitive adhesive of the second sheeting material.

38. A method according to claim 37 wherein the inkjet printer transfers a multi-color print indicia onto the die cut area of the liner.

39. The method of claim 37 wherein the computer and printer are able to reformat and print about 90 square centimeters to about 127 square centimeters per second of indicia onto the at least one surface.

40. The method of claim 37 wherein the variable print indicia is applied to said at least one surface as a mirror image of the indicia intended for viewing by users of the retroreflective article.

41. The method of claim 37 further comprising substantially continuously moving the retroreflective article having buried, readable indicia therein through a sheeter assembly, the sheeter assembly comprising means for providing a scissor-like cut to the continuously moving retroreflective article.

42. The method of claim 41 wherein the sheeter assembly comprises a knife blade and an anvil edge, the knife blade having a knife blade edge that is slanted relative to the anvil edge, the sheeter assembly further comprising a clamp member which provides means for short duration stoppage of the retroreflective article which is about to be cut.

43. The method of claim 42 wherein movement of the knife blade relative to the anvil edge is provided by action of a sensing and control subsystem comprising a solenoid, biasing means, and sensing means, wherein as the sensing means senses a predicted indicia or time mark on the retroreflective article, the solenoid is actuated to force the knife downward in a cutting motion toward the anvil edge.

44. The method of claim 43 further comprising aligning the knife blade as it moves in response to the solenoid and biasing means.

45. The method of claim 1 wherein said article is a license plate.

46. The method of claim 1 wherein portions of said indicia are variable and are selected immediately prior to making said article.

47. The method of claim 14 wherein said article is a license plate.

48. The method of claim 14 wherein portions of said indicia are variable and are selected immediately prior to making said article.

49. The method of claim 24 wherein said article is a license plate.

50. The method of claim 24 wherein portions of said indicia are variable and are selected immediately prior to making said article.

51. The method of claim 37 wherein said article is a license plate.

52. The method of claim 37 wherein portions of said indicia are variable and are selected immediately prior to making said article.

* * * * *